United States Patent
Jin et al.

(10) Patent No.: US 12,143,180 B2
(45) Date of Patent: Nov. 12, 2024

(54) GUARD INTERVALS FOR MULTI-USER HIGH EFFICIENCY (HE) WIRELESS LOCAL AREA NETWORK (WLAN) COMMUNICATION

(71) Applicant: InterDigital Patent Holdings, Inc., Wilmington, DE (US)

(72) Inventors: Yuan Sheng Jin, San Diego, CA (US); Fengjun Xi, San Diego, CA (US); Pengfei Xia, San Diego, CA (US); Nirav B. Shah, San Diego, CA (US); Hanqing Lou, Syosset, NY (US); Robert L. Olesen, Huntington, NY (US); Oghenekome Oteri, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/521,475

(22) PCT Filed: Oct. 22, 2015

(86) PCT No.: PCT/US2015/056956
§ 371 (c)(1),
(2) Date: Apr. 24, 2017

(87) PCT Pub. No.: WO2016/065169
PCT Pub. Date: Apr. 28, 2016

(65) Prior Publication Data
US 2018/0278308 A1 Sep. 27, 2018

Related U.S. Application Data

(60) Provisional application No. 62/068,331, filed on Oct. 24, 2014.

(51) Int. Cl.
*H04B 7/06* (2006.01)
*H04B 7/0452* (2017.01)
(Continued)

(52) U.S. Cl.
CPC ........ *H04B 7/0617* (2013.01); *H04B 7/0452* (2013.01); *H04B 7/0619* (2013.01);
(Continued)

(58) Field of Classification Search
None
See application file for complete search history.

(56) References Cited

U.S. PATENT DOCUMENTS 7,746,762 B2   6/2010   Sudo
8,665,908 B1*  3/2014   Zhang .................. H04W 24/02
                                                         370/474
(Continued)

FOREIGN PATENT DOCUMENTS

JP   2004-172721 A    6/2004
JP   2006352786 A2   12/2006
(Continued)

OTHER PUBLICATIONS

3GPP TS 36.211: Evolved Universal Terrestrial Radio Access (E-UTRA), Physical Channels and Modulation.
(Continued)

*Primary Examiner* — Andre Tacdiran
(74) *Attorney, Agent, or Firm* — Flaster Greenberg P.C.

(57) ABSTRACT

An access point (AP) in a high efficiency (HE) wireless local area network (WLAN) may transmit a message specifying to a group of stations a guard interval from one of two different guard intervals. The AP may receive responses from the
(Continued)

group of stations with the specified one of the two different guard intervals for multi-user uplink HE WLAN communication.

18 Claims, 17 Drawing Sheets

(51) Int. Cl.
*H04L 25/02* (2006.01)
*H04L 25/03* (2006.01)
*H04L 27/26* (2006.01)
*H04W 84/12* (2009.01)

(52) U.S. Cl.
CPC .... *H04L 25/0202* (2013.01); *H04L 25/03343* (2013.01); *H04L 27/2607* (2013.01); *H04L 27/2613* (2013.01); *H04L 27/2646* (2013.01); *H04W 84/12* (2013.01)

(56) References Cited

U.S. PATENT DOCUMENTS

| | | | |
|---|---|---|---|
| 8,842,571 B1* | 9/2014 | Yu | H04L 27/2662 370/252 |
| 9,525,474 B2* | 12/2016 | Park | H04L 5/0048 |
| 9,935,802 B2 | 4/2018 | Choi et al. | |
| 2005/0171720 A1* | 8/2005 | Olson | H04L 63/1433 702/121 |
| 2006/0250943 A1* | 11/2006 | Mujtaba | H04L 27/2613 370/210 |
| 2007/0230324 A1* | 10/2007 | Li | H04W 72/0406 370/204 |
| 2012/0294294 A1* | 11/2012 | Zhang | H04L 1/0079 370/474 |
| 2012/0294392 A1* | 11/2012 | Zhang | H04L 5/005 375/340 |
| 2012/0324315 A1* | 12/2012 | Zhang | H04L 1/004 714/776 |
| 2013/0229996 A1 | 9/2013 | Wang et al. | |
| 2013/0272347 A1* | 10/2013 | Merlin | H04B 1/38 375/219 |
| 2013/0286959 A1 | 10/2013 | Lou et al. | |
| 2014/0044112 A1* | 2/2014 | Stephens | H04W 24/10 370/328 |
| 2014/0185501 A1* | 7/2014 | Park | H04W 52/287 370/311 |
| 2014/0192823 A1* | 7/2014 | Tetzlaff | H04L 69/04 370/474 |
| 2014/0211775 A1 | 7/2014 | Sampath et al. | |
| 2014/0307653 A1* | 10/2014 | Liu | H04B 7/2612 370/329 |
| 2014/0348097 A1* | 11/2014 | Park | H04L 1/0009 370/329 |
| 2015/0078466 A1* | 3/2015 | Zhou | H04W 56/004 375/260 |
| 2015/0117227 A1* | 4/2015 | Zhang | H04L 27/2698 370/245 |
| 2015/0156788 A1* | 6/2015 | Yu | H04W 72/085 370/329 |
| 2015/0163081 A1* | 6/2015 | Sugiura | H04L 27/2646 375/267 |
| 2015/0382342 A1* | 12/2015 | Seok | H04W 72/0413 370/336 |
| 2016/0021568 A1* | 1/2016 | Yu | H04L 5/0048 370/329 |
| 2016/0066321 A1* | 3/2016 | Yu | H04L 27/2628 370/329 |
| 2016/0087766 A1* | 3/2016 | Sun | H04L 5/0007 370/329 |
| 2016/0100396 A1* | 4/2016 | Seok | H04L 5/003 370/329 |
| 2016/0255656 A1 | 9/2016 | Lou et al. | |
| 2016/0353370 A1* | 12/2016 | Choi | H04L 27/2613 |
| 2017/0201364 A1* | 7/2017 | Wang | H04B 7/00 |
| 2017/0223734 A1* | 8/2017 | Lin | H04W 74/04 |
| 2018/0159714 A1* | 6/2018 | Lee | H04L 29/08 |
| 2019/0020516 A1* | 1/2019 | Wang | H04L 27/2607 |

FOREIGN PATENT DOCUMENTS

| | | |
|---|---|---|
| JP | 2008312053 A2 | 12/2008 |
| WO | WO 1997/30531 A1 | 8/1997 |
| WO | WO 2010/050731 A2 | 5/2010 |
| WO | WO 2014171788 A1 | 10/2014 |

OTHER PUBLICATIONS

Chiueh et al., "OFDM Baseband Receiver Design for Wireless Communications", John Wiley and Sons (Asia) Pte Ltd, 2007, 240 pages.
IEEE 802.11-13/1380r0, Outdoor Channel Model Simulation Follow-Up, Nov. 2013, 10 pages.
IEEE, "IEEE Draft Standard for IT—Telecommunications and Information Exchange Between Systems—LAN/MAN—Specific Requirements—Part 11: Wireless LAN Medium Access Control and Physical Layer Specifications, Amendment 5: Enhancements for Very High Throughput for Operation in Bands below 6GHz", IEEE P802.11ac/D2.0, Jan. 2012, pp. 1-359.
IEEE, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Computer Society, IEEE Std 802.11™—2012, Mar. 29, 2012, 2793 pages.
IEEE, "IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications", IEEE P802.11-REVmb™/D12, Nov. 2011, 2910 pages.
IEEE, "IEEE Standard for Information Technology—Telecommunications and Information Exchange Between Systems—Local and Metropolitan Area Networks—Specific Requirements, Part 11, Wireless LAN Medium Access Control (MAC) and Physical Layer (PHY) Specifications. Amendment 3: TV White Spaces Operation", IEEE P802.11af(TM)/D1.02, Jun. 2011, 157 pages.
IEEE, "Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment—Sub 1 GHz License-Exempt Operation", IEEE Computer Society/LAN/MAN Standards Committee (C/LM), P802.11ah, 2010, 2 pages.
Perahia et al., "Next Generation Wireless LANs—Throughput, Robustness, and Reliability in 802.11n", Cambridge University Press, 2008, 410 pages.
Sun et al., "ICI/ISI-Aware Beamforming for MIMO-OFDM Wireless Systems", IEEE Transactions on Wireless Communications, vol. 11, No. 1, Jan. 2012, pp. 378-385.
Choi et al., "Discussion on OFDMA in HEW," IEEE 802.11-13/1382r0 (Nov. 11, 2013).
IEEE P802.11ah/D2.1, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D2.1 (Aug. 2014).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
Liu et al., "HEW Channel Model Document Template," IEEE P802.11 Wireless LANs, IEEE 802.11-14/0671r0 (Oct. 16, 2013)

(56) References Cited

OTHER PUBLICATIONS (uploaded to IEEE website on May 14, 2014; see https://mentor.ieee.org/802.11/documents?is_dcn=0671 &is_year-2014).

Third Generation Partnership Project, "Technical Specification Group Radio Access Network; Evolved Universal Terrestrial Radio Access (E-UTRA); Physical channels and modulation (Release 12)," 3GPP TS 36.211 V12.3.0 (Sep. 2014).

Wang et al., "Proposed 802.11ax Functional Requirements," IEEE P802.11 Wireless LANs, IEEE 802.11-14/0567r3 (May 14, 2014).

* cited by examiner

1500

GUARD INTERVALS FOR MULTI-USER HIGH EFFICIENCY (HE) WIRELESS LOCAL AREA NETWORK (WLAN) COMMUNICATION

CROSS-REFERENCE TO RELATED APPLICATIONS

This application is the National Stage Entry under 35 U.S.C. § 371 Patent Cooperation Treaty Application No. PCT/US2015/056956, filed Oct. 22, 2015, which claims the benefit of U.S. Provisional Application No. 62/068,331, filed Oct. 24, 2014, the disclosure of which are incorporated herein by references in their entirety.

BACKGROUND

Orthogonal frequency-division multiplexing (OFDM) modulation may use a cyclic prefix (CP) for inter-symbol interference due to underlying multipath fading channels. A large delay spread (e.g., larger than the current CP length, e.g., 800 nano-seconds) may create inter-symbol interference and inter-carrier interference. A large delay spread in an outdoor urban micro (UMI or UMi) channel may create a catastrophic performance when the existing CP length of 800 nano-seconds is used for OFDM/OFDMA modulation.

SUMMARY

An access point may use time domain null-forming. An access point (AP) may send a channel training request to a station (STA). The AP may receive a channel training packet in response to the channel training request. The channel training packet may include a legacy long training field (LTF). The AP may estimate the channel. The channel estimation may be computed using the legacy LTF. The AP may compute a null-forming vector using the channel estimation. The AP may code the channel training packet. The channel training packet may be coded using the null-forming vector.

An access point may include an access point for communicating with multiple stations. The access point may have a memory comprising multiple guard intervals, e.g., three guard intervals. The access point may have a processor comprising executable instructions that when executed requests information from the multiple stations that is associated with a guard interval for each station that comprises one of the three guard intervals; processes received information from the multiple stations that indicates the requested guard interval for each station that comprises one of the three guard intervals; and/or selects, for a multi-user transmission, one of the three guard intervals for communicating with the multiple stations based on the received information. The access point processor may comprise executable instructions that cause the access point to select for a single-user communication one of the three guard intervals for communicating with one of the multiple stations in a single-user communication based on received information from the multiple stations. The access point may comprise executable instructions for selecting one of the three guard intervals comprising selecting the longest guard interval indicated by the received information. The received information may comprise a data field used by each of the multiple stations to indicate the requested guard interval. The processor may comprise executable instructions for requesting a schedule for each of the multiple stations to provide the received information according to the schedule.

The three guard intervals may comprise a first, a second, and a third guard interval, wherein the first guard interval is shorter than the second and the third guard intervals, and the second guard interval is shorter than the third guard interval. The access point executable instructions for requesting information may comprise requesting a time domain channel estimate of a frame received by each of the multiple stations. The requested information may use a cycle prefix discovery frame.

An access point for communicating with multiple stations, comprising a memory comprising three guard intervals and a processor comprising executable instructions that when executed request, from the multiple stations, a guard interval that comprises one of three guard intervals; receive, from each of the multiple stations, feedback indicating the requested guard interval, for each station, that comprises one of three guard intervals; and select one of the three guard intervals based on the feedback. The three guard intervals may comprise a first, a second, and a third guard interval, wherein the first guard interval is shorter than the second and the third guard intervals, and the second guard interval is shorter than the third guard interval. Selecting may comprise selecting one of the three guard intervals for communicating with one of the multiple stations in a single-user communication based on received information from the multiple stations. Selecting may alternatively or also comprise selecting one of the three guard intervals for communicating with the multiple stations in a multiple station transmission based on the received information. Requesting a guard interval may comprise requesting a time domain channel estimate of a frame received by a station.

BRIEF DESCRIPTION OF THE DRAWINGS

A more detailed understanding may be had from the following description, given by way of example in conjunction with the accompanying drawings.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application.

Figure 1:
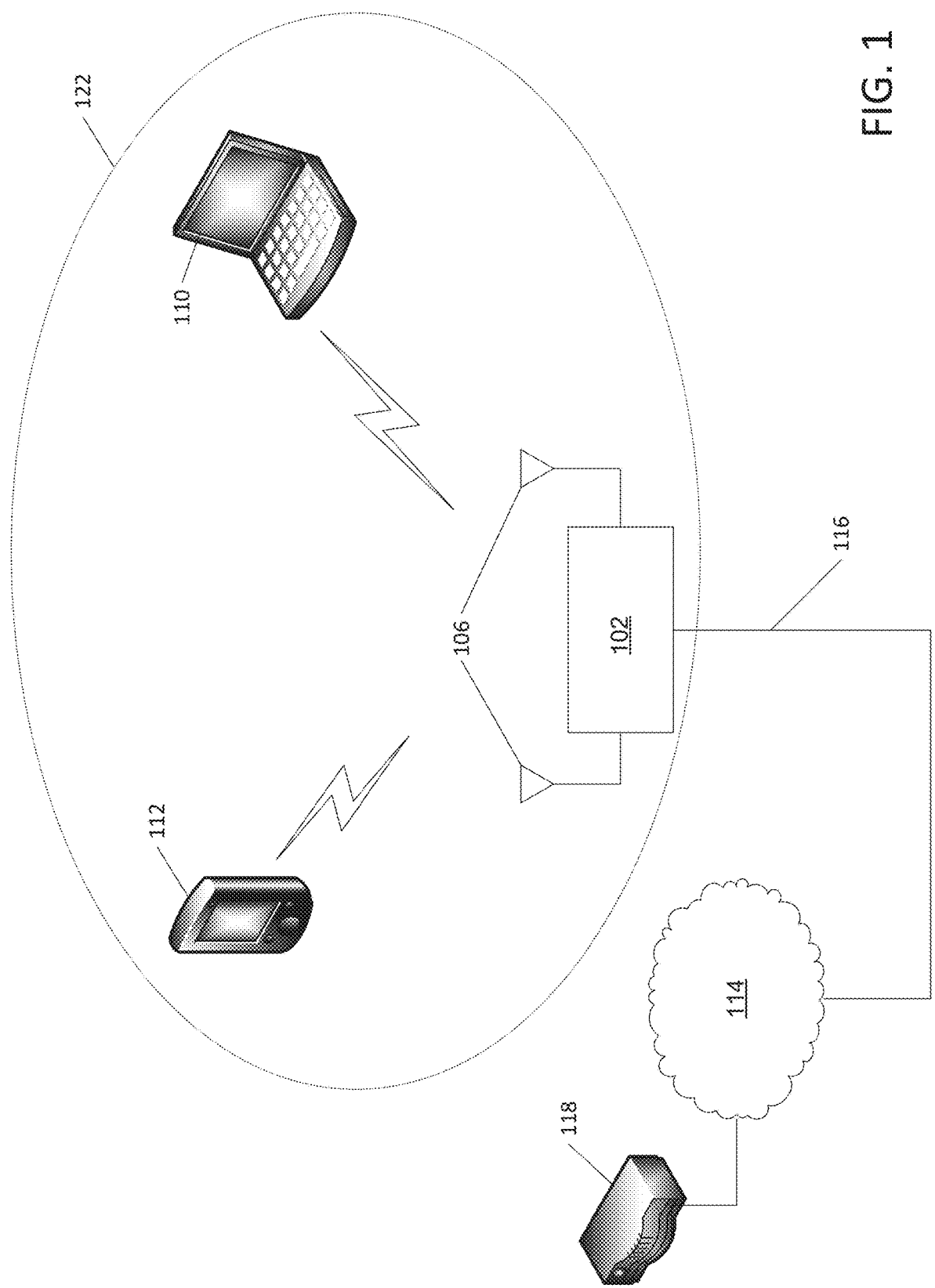
FIG. 1 illustrates an example of Wireless Local Area Network (WLAN) devices.

FIG. 1 illustrates exemplary wireless local area network (WLAN) devices. The WLAN may include, but is not limited to, access point (AP) 102, station (STA) 110, and STA 112. STA 110 and 112 may be associated with AP 102. The WLAN may be configured to implement one or more protocols of the IEEE 802.11 communication standard, which may include a channel access scheme, such as DSSS, OFDM, OFDMA, etc. A WLAN may operate in a mode, e.g., an infrastructure mode, an ad-hoc mode, etc.

A WLAN operating in an infrastructure mode may comprise one or more APs communicating with one or more associated STAs. An AP and STA(s) associated with the AP may comprise a basic service set (BSS). For example, AP 102, STA 110, and STA 112 may comprise BSS 122. An extended service set (ESS) may comprise one or more APs (with one or more BSSs) and STA(s) associated with the APs. An AP may have access to, and/or interface to, distribution system (DS) 116, which may be wired and/or wireless and may carry traffic to and/or from the AP. Traffic to a STA in the WLAN originating from outside the WLAN may be received at an AP in the WLAN, which may send the traffic to the STA in the WLAN. Traffic originating from a STA in the WLAN to a destination outside the WLAN, e.g., to server 118, may be sent to an AP in the WLAN, which may send the traffic to the destination, e.g., via DS 116 to network 114 to be sent to server 118. Traffic between STAs within the WLAN may be sent through one or more APs. For example, a source STA (e.g., STA 110) may have traffic intended for a destination STA (e.g., STA 112). STA 110 may send the traffic to AP 102, and, AP 102 may send the traffic to STA 112.

A WLAN may operate in an ad-hoc mode. The ad-hoc mode WLAN may be referred to as independent basic service set (IBBS). In an ad-hoc mode WLAN, the STAs may communicate directly with each other (e.g., STA 110 may communicate with STA 112 without such communication being routed through an AP).

IEEE 802.11 devices (e.g., IEEE 802.11 APs in a BSS) may use beacon frames to announce the existence of a WLAN network. An AP, such as AP 102, may transmit a beacon on a channel, e.g., a fixed channel, such as a primary channel. A STA may use a channel, such as the primary channel, to establish a connection with an AP.

STA(s) and/or AP(s) may use a Carrier Sense Multiple Access with Collision Avoidance (CSMA/CA) channel access mechanism. In CSMA/CA a STA and/or an AP may sense the primary channel. For example, if a STA has data to send, the STA may sense the primary channel. If the primary channel is detected to be busy, the STA may back off. For example, a WLAN or portion thereof may be configured so that one STA may transmit at a given time, e.g., in a given BSS. Channel access may include RTS and/or CTS signaling. For example, an exchange of a request to send (RTS) frame may be transmitted by a sending device and a clear to send (CTS) frame that may be sent by a receiving device. For example, if an AP has data to send to a STA, the AP may send an RTS frame to the STA. If the STA is ready to receive data, the STA may respond with a CTS frame. The CTS frame may include a time value that may alert other STAs to hold off from accessing the medium while the AP initiating the RTS may transmit its data. On receiving the CTS frame from the STA, the AP may send the data to the STA.

A device may reserve spectrum via a network allocation vector (NAV) field. For example, in an IEEE 802.11 frame, the NAV field may be used to reserve a channel for a time period. A STA that wants to transmit data may set the NAV to the time for which it may expect to use the channel. When a STA sets the NAV, the NAV may be set for an associated WLAN or subset thereof (e.g., a BSS). Other STAs may count down the NAV to zero. When the counter reaches a value of zero, the NAV functionality may indicate to the other STA that the channel is now available.

The devices in a WLAN, such as an AP or STA, may include one or more of the following: a processor, a memory, a radio receiver and/or transmitter (e.g., which may be combined in a transceiver), one or more antennas (e.g., antennas 106 in FIG. 1), etc. A processor function may comprise one or more processors. For example, the processor may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and the like. The one or more processors may be integrated or not integrated with each other. The processor (e.g., the one or more processors or a subset thereof) may be integrated with one or more other functions (e.g., other functions such as memory). The processor may perform signal coding, data processing, power control, input/output processing, modulation, demodulation, and/or any other functionality that may enable the device to operate in a wireless environment, such as the WLAN of FIG. 1. The processor may be configured to execute processor executable code (e.g., instructions) including, for example, software and/or firmware instructions. For example, the processor may be configured to execute computer readable instructions included on one or more of the processors (e.g., a chipset that includes memory and a processor) or memory. Execution of the instructions may cause the device to perform one or more of the functions described herein.

A device may include one or more antennas. The device may employ multiple input multiple output (MIMO) techniques. The one or more antennas may receive a radio signal. The processor may receive the radio signal, e.g., via the one or more antennas. The one or more antennas may transmit a radio signal (e.g., based on a signal sent from the processor).

The device may have a memory that may include one or more devices for storing programming and/or data, such as processor executable code or instructions (e.g., software, firmware, etc.), electronic data, databases, or other digital information. The memory may include one or more memory units. One or more memory units may be integrated with one or more other functions (e.g., other functions included in the device, such as the processor). The memory may include a read-only memory (ROM) (e.g., erasable programmable read only memory (EPROM), electrically erasable programmable read only memory (EEPROM), etc.), random access memory (RAM), magnetic disk storage media, optical storage media, flash memory devices, and/or other non-transitory computer-readable media for storing information. The memory may be coupled to the processor. The processor may communicate with one or more entities of memory. e.g., via a system bus, directly, etc.

In IEEE 802.11n, High Throughput (HT) STAs may use a 40 MHz wide channel for communication. This may be achieved, for example, by combining the primary 20 MHz channel, with an adjacent 20 MHz channel to form a 40 MHz wide contiguous channel.

In IEEE 802.11ac, very high throughput (VHT) STAs may support 20 MHz, 40 MHz, 80 MHz, and/or 160 MHz wide channels. The 40 MHz, and 80 MHz, channels may be formed, e.g., by combining contiguous 20 MHz channels. A 160 MHz channel may be formed, for example, by combining eight contiguous 20 MHz channels, or by combining two non-contiguous 80 MHz channels (e.g., referred to as an 80+80 configuration). For the 80+80 configuration, the data, after channel encoding, may be passed through a segment parser that may divide it into two streams. Inverse fast Fourier transform (IFFT), and time domain, processing may be done on each stream separately. The streams may be mapped on to the two channels, and the data may be transmitted. At the receiver, this mechanism may be reversed, and the combined data may be sent to the MAC.

IEEE 802.11af and IEEE 802.11ah may support sub 1 GHz modes of operation. For these specifications the channel operating bandwidths may be reduced relative to those used in IEEE 802.11n, and IEEE 802.11ac. IEEE 802.11af may support 5 MHz, 10 MHz and/or 20 MHz bandwidths in the TV White Space (TVWS) spectrum, and IEEE 802.11ah may support 1 MHz, 2 MHz, 4 MHz, 8 MHz, and/or 16 MHz bandwidths, e.g., using non-TVWS spectrum. IEEE 802.11ah may support Meter Type Control (MTC) devices in a macro coverage area. MTC devices may have capabilities including, for example, support for limited bandwidths, and a requirement for a very long battery life.

In WLAN systems that may support multiple channels, and channel widths, e.g., IEEE 802.11n, IEEE 802.11ac, IEEE 802.11af, and/or IEEE 802.11ah, may include a channel, which may be designated as the primary channel. The primary channel may have a bandwidth that may be equal to the largest common operating bandwidth supported by the STAs in the BSS. The bandwidth of the primary channel may be limited by a STA operating in a BSS that may support the smallest bandwidth operating mode. For example, in IEEE 802.11ah, the primary channel may be 1 MHz wide, if there may be STAs (e.g., MTC type devices) that may support a 1 MHz mode even if the AP, and other STAs in the BSS, may support a 2 MHz, 4 MHz, 8 MHz, 16 MHz. or other channel bandwidth operating modes. The carrier sensing, and NAV settings, may depend on the status of the primary channel. If the primary channel is busy, for example, due to a STA supporting a 1 MHz operating mode transmitting to the AP, the available frequency bands may be considered busy even though majority of the bands may stay idle and available.

In the United States, for example, the available frequency bands that may be used by IEEE 802.11ah may be from 902 MHz to 928 MHz. In Korea, for example, it may be from 917.5 MHz to 923.5 MHz. In Japan, for example, it may be from 916.5 MHz to 927.5 MHz. The total bandwidth available for IEEE 802.11ah may be 6 MHz to 26 MHz may depend on the country code.

A WLAN in Infrastructure Basic Service Set (BSS) mode may have an Access Point (AP) for the BSS and one or more stations (STAs) associated with the AP. The AP may have (e.g., may typically have) access and/or interface to a Distribution System (DS) and/or another type of wired/wireless network that carries traffic in and/or out of the BSS.

Traffic to STAs that may originate from outside the BSS arrives through the AP and may be delivered to the STAs. Traffic originating from STAs to destinations outside the BSS may be sent to the AP to be delivered to the respective destinations. Traffic between STAs within the BSS may be sent through the AP where the source STA sends traffic to the AP and the AP delivers the traffic to the destination STA. Traffic between STAs within a BSS may be peer-to-peer traffic. Peer-to-peer traffic may be sent directly between the source and destination STAs with a link (e.g., a direct link) setup (DLS), for example, using an 802.11e DLS or an 802.11z tunneled DLS (TDLS). A WLAN in Independent BSS (IBSS) mode may not have an AP and STAs communicate directly with each other. This mode of communication may be referred to as "ad-hoc" mode of communication.

In an 802.11 infrastructure mode of operation, the AP may transmit a beacon on a fixed channel. A fixed channel may be referred to as a primary channel. The primary channel may be 20 MHz wide and may be the operating channel of the BSS. The primary channel may be used by the STAs to establish a connection with the AP. The fundamental channel access mechanism in 802.11 may be Carrier Sense Multiple Access with Collision Avoidance (CSMA/CA). In this mode of operation, one or more (e.g., every) STA, including the AP, may sense the primary channel. If the channel is detected to be busy, the STA may back off and one STA (e.g., only one STA) may transmit at any given time in a given BSS.

802.11n, and 802.11ac may have been defined for operation, for example, frequencies from 2 to 6 GHz.

In 802.11n, High Throughput (HT) STAs may use a 40 MHz wide channel for communication. A 40 MHz wide channel for communication may be achieved by combining a primary 20 MHz channel, with an adjacent 20 MHz channel to form a 40 MHz wide channel.

In 802.11ac, Very High Throughput (VHT) STAs may support 20 MHz. 40 MHz, 80 MHz and 160 MHz wide channels. While 40 MHz and 80 MHz channels may be formed by combining contiguous 20 MHz channels similar to 802.11n, 160 MHz channel may be formed either by combining 8 contiguous 20 MHz channels or two non-contiguous 80 MHz channels (80+80 configuration).

For example, in an "80+80" configuration, the data after channel encoding may be passed through a segment parser that divides the data into two streams. IFFT and time domain processing may be done on one or more streams (e.g., each stream) separately. The streams may be mapped on to the two channels and the data may be sent out. On the receiving end, this mechanism may be reversed and the combined data may be sent to the MAC.

The RTS-CTS short interframe space (SIFS) may be 16 µs. The guard interval (GI) may be 0.8 µs. Transmissions from nodes within 100 m may remain within the GI. Beyond 100 m, the delay may be longer than 0.8 µs. At 1 km, the delay may be over 6 µs.

802.11af and 802.11ah may be introduced for operation in frequencies that are less than 1 GHz.

For 802.11af, and 802.11ah, the channel operating bandwidths may be reduced, for example, as compared to 802.11n, and 802.11ac. 802.11af may support 5 MHz, 10 MHz and 20 MHz wide bands in TV White Space (TVWS), while 802.11ah may support 1 MHz, 2 MHz, 4 MHz, 8 MHz and 16 MHz in non-TVWS. One or more STAs in 802.11ah may be considered to be sensors with limited capabilities and may support (e.g., may only support) 1 and 2 MHz transmission modes.

In the existing WLAN systems which utilize multiple channel widths such as 802.11n, 802.11ac, 802.11af, and 802.11ah, there may be a primary channel. A primary channel may have a bandwidth equal to the largest common operating bandwidth supported by one or more (e.g., all) STAs in the BSS. The bandwidth of the primary channel may be limited by the STA that supports the smallest bandwidth operating mode. In 802.11ah, the primary channel may be 1 or 2 MHz wide, for example, if there are STAs that only support 1 and 2 MHz modes, while the AP and other STAs in the BSS may support 4 MHz, 8 MHz and 16 MHz operating modes. Carrier sensing (e.g., all carrier sensing) and NAV setting may depend on the status on the primary channel. For example, if the primary channel is busy due to an STA supporting only 1 and 2 MHz operating modes transmitting to the AP, the entire available frequency bands may be considered busy even though majority of it stays idle and/or available. In 802.11ah and 802.11af, packets (e.g., all packets) may be transmitted using a clock that may be down clocked 4 or 10 times, for example, as compared to the 802.11ac specification.

To improve spectral efficiency, 802.11ac may utilize downlink Multi-User MIMO (MU-MIMO) transmission to multiple STA's in the same symbol's time frame, for example, during a downlink OFDM symbol. 802.11ah may utilize downlink MU-MIMO. Since downlink MU-MIMO in 802.11ac may use the same symbol timing to multiple STA's, interference of the waveform transmissions to multiple STA's may not be an issue. One or more (e.g., all) STA's involved in MU-MIMO transmission with the AP may (e.g., must) use the same channel or band, for example, limiting the operating bandwidth to the smallest channel bandwidth that may be supported by the STA's, which may be included in the MU-MIMO transmission with the AP.

802.11ac may form channels by combing up to eight contiguous 20 MHz channels or two non-contiguous 80 MHz channels. Transmission procedure in 802.11ac may use allocated bandwidth (e.g., the entire allocated bandwidth) for transmission and/or reception. OFDMA may be utilized in LTE and WiMax to address inefficiencies caused by channel based resource scheduling, for example, as may be used by 802.11ac. A direct application of OFDMA to WiFi may introduce backward compatibility issues. Coordinated Orthogonal Block-based Resource Allocation (COBRA) may utilize OFDMA to resolve WiFi backward compatibility issues and the implicit inefficiencies that may be caused by channel based resource scheduling. For example, COBRA may enable the transmission over multiple smaller frequency-time resource units. Multiple users may be allocated to non-overlapping frequency-time resource unit(s) and may be enabled to transmit and/or receive simultaneously. A sub-channel may be utilized as a basic frequency resource unit that an AP may allocate to a STA. For example, considering backward compatibility with 802.11n/ac, a sub-channel may be utilized as a 20 MHz channel.

COBRA and/or OFDMA may utilize multicarrier modulation, filtering, time, frequency, space, and/or polarization domains as the basis for a transmission and coding scheme.

COBRA may be implemented using OFDMA Subchannelization, SC-FDMA Subchannelization, and/or Filter-Bank Multicarrier Subchannelization.

To enable COBRA and/or OFDMA transmissions, one or more of the following may be utilized: implementations for sub-channelization, implementations for coverage range extension, implementations for channel bandwidth selection, implementations of grouping users, implementations for channel access, preamble designs that enable low overhead, implementations that support beamforming and sounding for frequency and timing synchronization, or implementations for link adaptation.

Timing and/or frequency synchronization algorithms for COBRA may have issues in practical implementation in future WLAN systems.

Multi-user and single user multiple parallel (MU-PCA) channel access schemes may be utilized. MU-PCA may provide additional implementations to those introduced with COBRA, or OFDMA, which may include one or more of the following: multi-user/single-user parallel channel access using transmit/receive with symmetrical bandwidth or multi-user/single-user parallel channel access transmit/receive with asymmetrical bandwidth. Multi-user/single-user parallel channel access using transmit/receive with symmetrical bandwidth may comprise down-link parallel channel access for multiple/single users, up-link parallel channel access for multiple/single users, combined down-link and up-link parallel channel access for multiple/single users, design to support unequal MCS and unequal transmit power for OFDMA, MU-PCA, and COBRA, PHY designs and procedures to support multi-user/single-user parallel channel access using transmit/receive with symmetrical bandwidth, and/or Mixed MAC/PHY multi-user parallel channel access. Multi-user/single-user parallel channel access transmit/receive with asymmetrical bandwidth may comprise one or more of the following: MAC designs and/or procedures for downlink, uplink and combined uplink and downlink for multi-user/single-user parallel channel access using transmit/receive with asymmetrical bandwidth; or PHY designs and/or procedures to support multi-user/single-user parallel channel access using transmit/receive with asymmetrical bandwidth.

Physical layer transmitter block diagrams, such as transmitter and receiver block diagrams, two transmitter block diagrams for multiple data stream transmissions, and/or transmitter block diagrams for possible scenarios may be illustrated in 802.11 specifications. The depicted transmitter designs may be for single user transmission (e.g., only single user transmission). The depicted transmitter designs may be related to downlink multi-user transmissions in which multiple users are distinguished from each other by a spatial mapping, for example, if MU-MIMO is involved. MU-MIMO may be supported (e.g., only supported) for down-link transmissions in 802.11ac for up to four STAs.

An outdoor channel may experience a large delay spread. OFDM modulation (e.g., as referenced in IEEE 802.11n, 802.11ac) may use a cyclic prefix (CP) to deal with the inter-symbol interference due to the underlying multipath fading channels. The OFDM symbol period (e.g., without CP) may be 3.2, 6.4, 12.8, or 25.6 micro-seconds. The CP length may be 0.4, 0.8, 1.2, or 1.6 micro-seconds. The total OFDM symbol period (e.g., with CP) may be 4.0 micro-seconds.

An 0.8 or smaller micro-second (e.g., or 800 nano-second) CP may be able to handle indoor wireless channels, for example, a delay spread (e.g., corresponding delay spread) that is less than 800 nano-second. Different channel types (e.g., six different channel types) may be referred to as channel A, B, C, D, E and F for IEEE 802.11n and 802.11ac. Channel B may have a delay spread of 80 nano-second, within the 800 nano-second CP period. Channel D may have a delay spread of 390 nano-second, within the 800 nano-second CP period. Inter-symbol interference may be successfully removed due to OFDM modulation (e.g., CP insertion/IFFT at the transmitter, CP removal/IFFT at the receiver).

Figure 2:
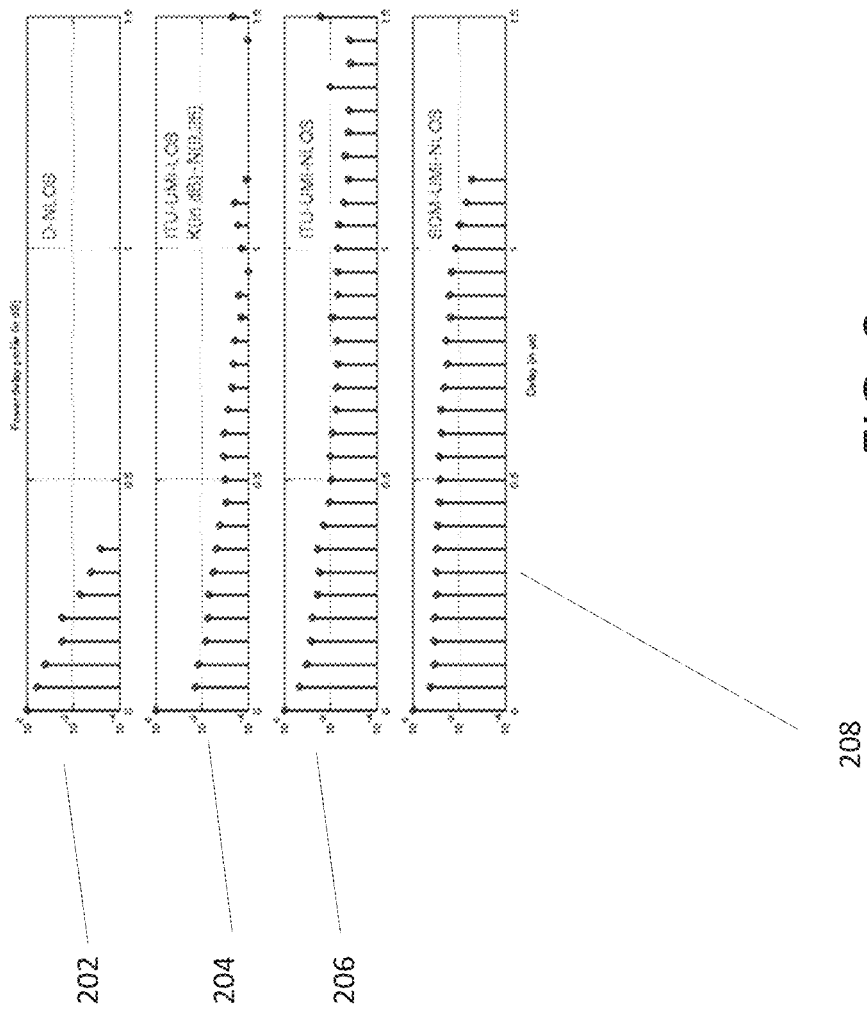
FIG. 2 is an example of outdoor channel delay spread

The ITU UMI (e.g., urban micro) channel model may be selected as the channel model for outdoor scenarios. FIG. 2 is an example of outdoor channel delay spread 200 showing a power delay profile in dB for D-NLOS 202, ITU-UMi-LOS 206, ITU-UMi-NLOS 206, and SCM-UMi-NLOS 208 with the power on the y-axis and the delay in time on the x-axis. As shown in FIG. 2, an outdoor UMI channel may have a delay spread of over 800 nano-seconds. 802.11ax may be designed to support an outdoor propagation channel. 802.11ax may use a variant of OFDM, or OFDMA. An outdoor propagation channel may have a delay spread in excess of 800 nano-seconds.

The large delay spread (e.g., larger than an 800 nanosecond CP length for outdoor UMI channels) may create inter-symbol interference, and/or inter-carrier interference. Inter-symbol interference (ISI) may refer to the interference from one OFDM symbol to the next OFDM symbol. Inter-carrier interference (ICI) may refer to the interference from one OFDM sub-carrier to the adjacent OFDM sub-carriers.

Figure 3:
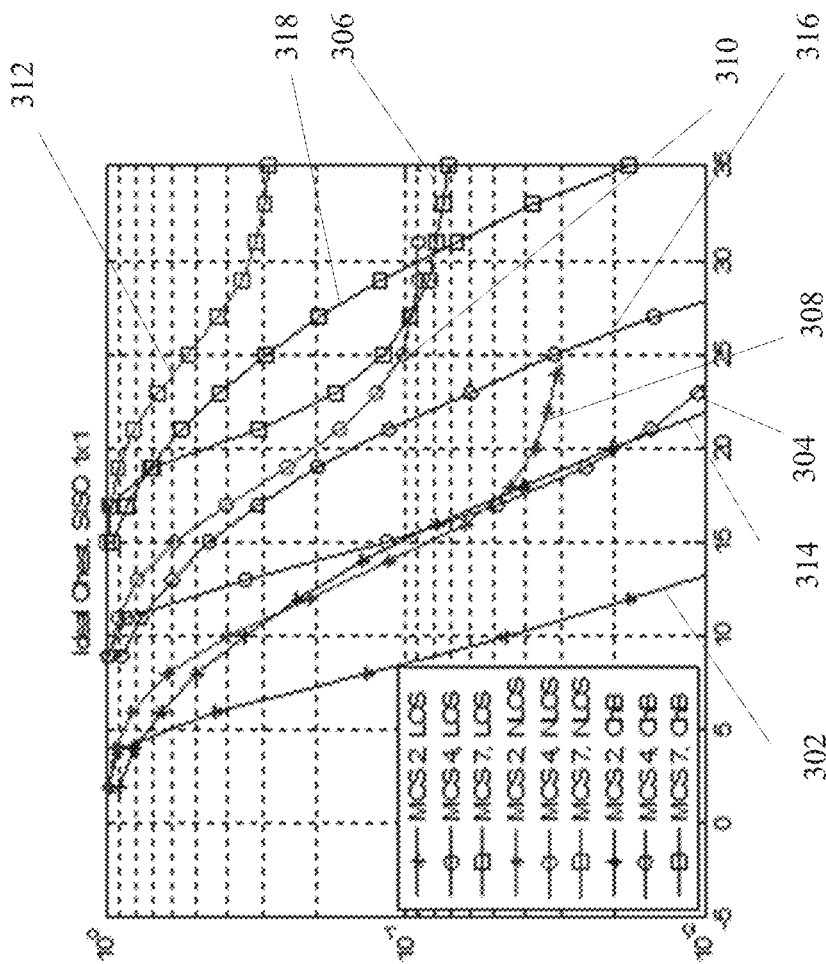
FIG. 3 is an example of OFDM performance with insufficient CP Single Input Single Output (SISO).

FIG. 3 is an example of OFDM performance in the presence of insufficient CP (SISO). FIG. 3 depicts 9 curves, representing modulation and coding scheme ("MCS") 2, line of sight ("LOS") 302; MCS 4, LOS 304; MCS 7, LOS 306; MCS 2. NLOS 308; MCS 4, NLOS 310; MCS 7. NLOS 312; MCS 2, channel B ("CHB") 314, MCS 4, CHB 316; and MCS 7, CHB 318.

FIG. 3 shows the OFDM performance using an outdoor channel with a CP length of 800 ns (e.g., insufficient in most cases). From this figure it may be observed that the line-of-sight (LoS) performance may be satisfactory for low MCS (e.g., MCS 2) (e.g., curves 302, 308, 314). An error floor may occur when using a high MCS (e.g., MCS 7) (e.g., curves 306, 312, 316) due to the presence of ISI and ICI. For non-line-of-sight (NLoS) (e.g., curves 308, 310, 312), the performance may suffer from error floors (e.g., significant error floors) even when using low MCSs (e.g., curve 308), for example, due to the presence of more significant ISI and ICI. For the indoor channel B model (e.g., curves 314, 316, 318), the performance curve does not have an observable error floor.

Figure 4:
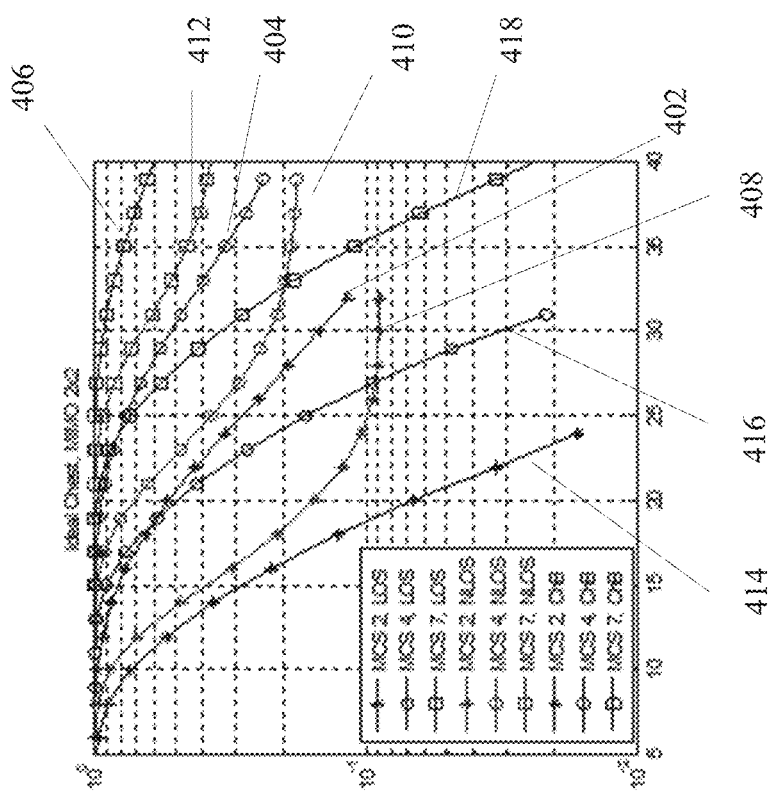
FIG. 4 is an example of OFDM performance with insufficient CP Multiple Input Multiple Output (MIMO).

FIG. 4 is an example of OFDM performance using an insufficient CP (MIMO). FIG. 4 shows an example of OFDM performance using an outdoor channel with a traditional CP length of 800 nano-seconds (e.g., insufficient in most cases), for a 2×2 MIMO.

FIG. 2 depicts 9 curves, representing modulation and coding scheme ("MCS") 2, line of sight ("LOS") 402; MCS 4, LOS 404; MCS 7, LOS 406; MCS 2, NLOS 408; MCS 4, NLOS 410; MCS 7, NLOS 412; MCS 2, channel bonding ("CHB") 414, MCS 4, CHB 416; and MCS 7, CHB 418.

In the LoS (line-of-sight) scenarios (e.g., curves 402, 404, 406), the performance curve does have an observable error floor. There may be diversity (e.g., significant diversity) loss due to a rank deficient condition of the LoS channel. In the NLoS (non-line-of-sight) scenarios (e.g., curves 408, 410, 412), performance may suffer from an error floor (e.g., significant error floors) even when using low MCSs, due to the presence of ISI and ICI. For the indoor channel B model (e.g., curves 414, 416, 418), the performance curves may not have an observable error floor or diversity loss.

The large delay spread present in an outdoor channel, such as that modeled in the outdoor UMI channel, may cause a catastrophic performance loss with the use of a 800 nano-second CP length, such as that used in 802.11ac, and a similar loss of performance may be expected in 802.11ax for either OFDM or OFDMA modulation unless measures are taken to address this.

STAs with large delay spread channels in mixed mode may be identified. The cyclic prefix length may be dynamically adjusted to cover the delay spread of the channel. Existing 802.11 standards have a normal guard interval and a short guard interval with the GI being selected blindly. With the possibility of more than two GIs being used, the GI may be determined and communicated to the transmitting node.

Channel Estimation may be used for STAs with large delay spread channels and multiple antennas. To enable proper frequency domain channel estimation, the CP length may be greater than the delay spread of the channel. If the CP length is less than the channel delay spread, the inter-channel interference may result in a poor channel estimate.

Figure 5:
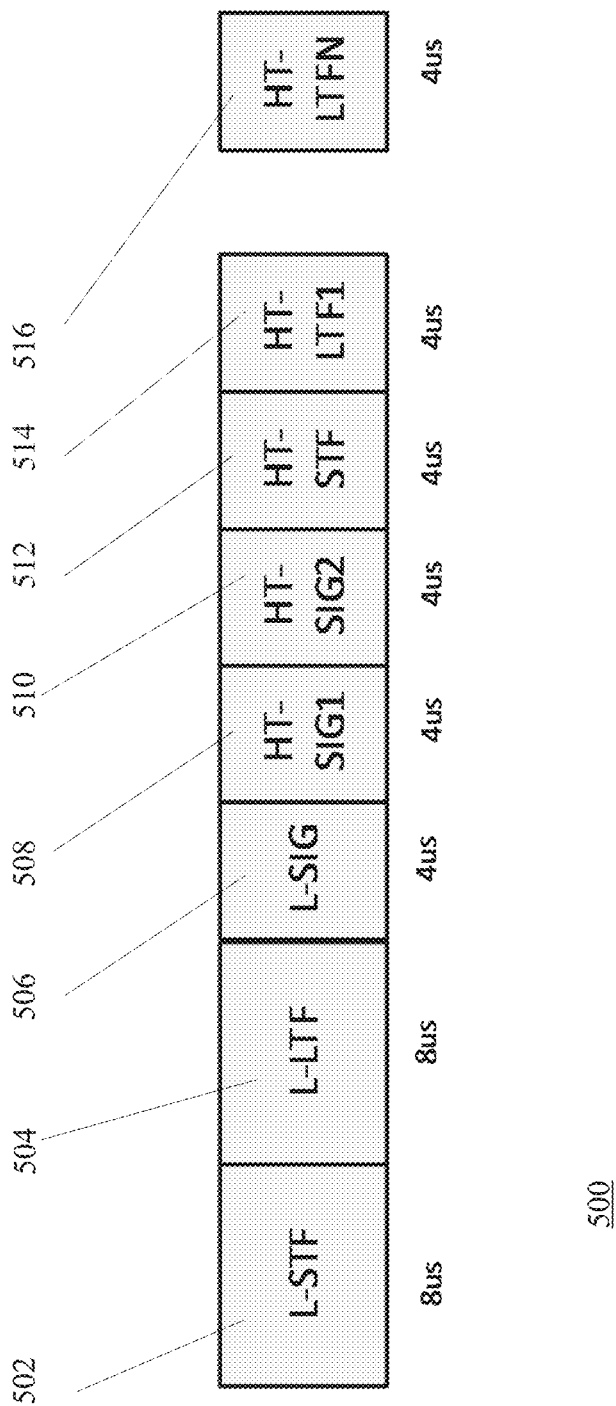
FIG. 5 is an example of a Null Data Packet ("NDP") frame.

FIG. 5 is an example existing NDP frame 500. The NDP frame 500 may have a non-HT short training field (L-STF) 502, a non-HT long training field (L-LTF) 504, a non-HT signal field (L-SIG) 506, and an HT signal field 508. In 802.11, the Legacy Long Training Field (L-LTF) may be composed of two 3.2 usec long training symbols with a 1.6 usec (1600 nsec) cyclic prefix. This may be sufficient to estimate the UMI channel in a Single-Input-Single-Output scenario (e.g., as shown in FIG. 2). For multiple antenna estimation, 802.11 may use a null data packet (NDP) in which no data is transmitted. In this case, a single LTF may be sent (e.g., which may be used to estimate the long delay spread channel). The high throughput Long Training Field (HT-LTF) 514 may be set with a 0.8 usec guard interval, which may imply the channel estimation for one or more (e.g., each) of the transmit antennas may be poor. Modifications to the NDP for channel estimation in long delay spread channels may be beneficial.

Time delay null forming may be used. The packet error rate (PER) performance error floor in FIG. 3 and FIG. 4 may be due to inter symbol interference (ISI) and inter carrier interference (ICI), for example, when the delay spread may be larger than the CP length. To achieve satisfactory error performance and/or remove/reduce the error floor, the CP length may be (e.g., may need to be) larger than the delay spread. With the physical channel given, it may not be possible to change the delay spread of the physical channel. Transmit/receive beamforming/null-forming may be applied to decrease the delay spread of the virtual channel (e.g., combination of the physical channel and the beamforming operation).

For example, $h_1, h_2, h_3, \ldots, h_L, h_{L+1}, h_{L+2}, \ldots, h_{L+N-1}$ may be the multipath channel of the underlying physical channel, where the number of taps is L+N−1. L may be the number of taps covered by the CP length. Since the channel delay spread L+N−1 may be larger than the CP length L, ISI/ICI may occur.

If multiple transmit antennas and a single receive antenna are present in a network, each tap may be a vector of M×1. M may be the number of transmit antennas. At the transmitter side, after IFFT operation and CP insertion, null-forming operation may be applied with the transmitter signal being multiplied by an antenna-dependent beamforming coefficient. The beamforming vector w (of size M×1) may refer to the collection of beamforming (e.g., all beamforming) coefficients on multiple transmit antennas.

Beamforming may be used to maximize the received signal energy (e.g., maximum ratio combining/transmission). If beamforming is used to optimize the received signal energy from the first channel tap, the beamforming vector (e.g., traditional beamforming vector) may be formed as the channel vector on the desired channel tap, for example:

$$w = h_1$$

A conjugate version of the beamforming vector may be applied. Vector normalization may be used to make sure the total transmit signal power does not scale inappropriately.

Null-forming may be applied here, for example, to remove/reduce self-interference.

Figure 6:
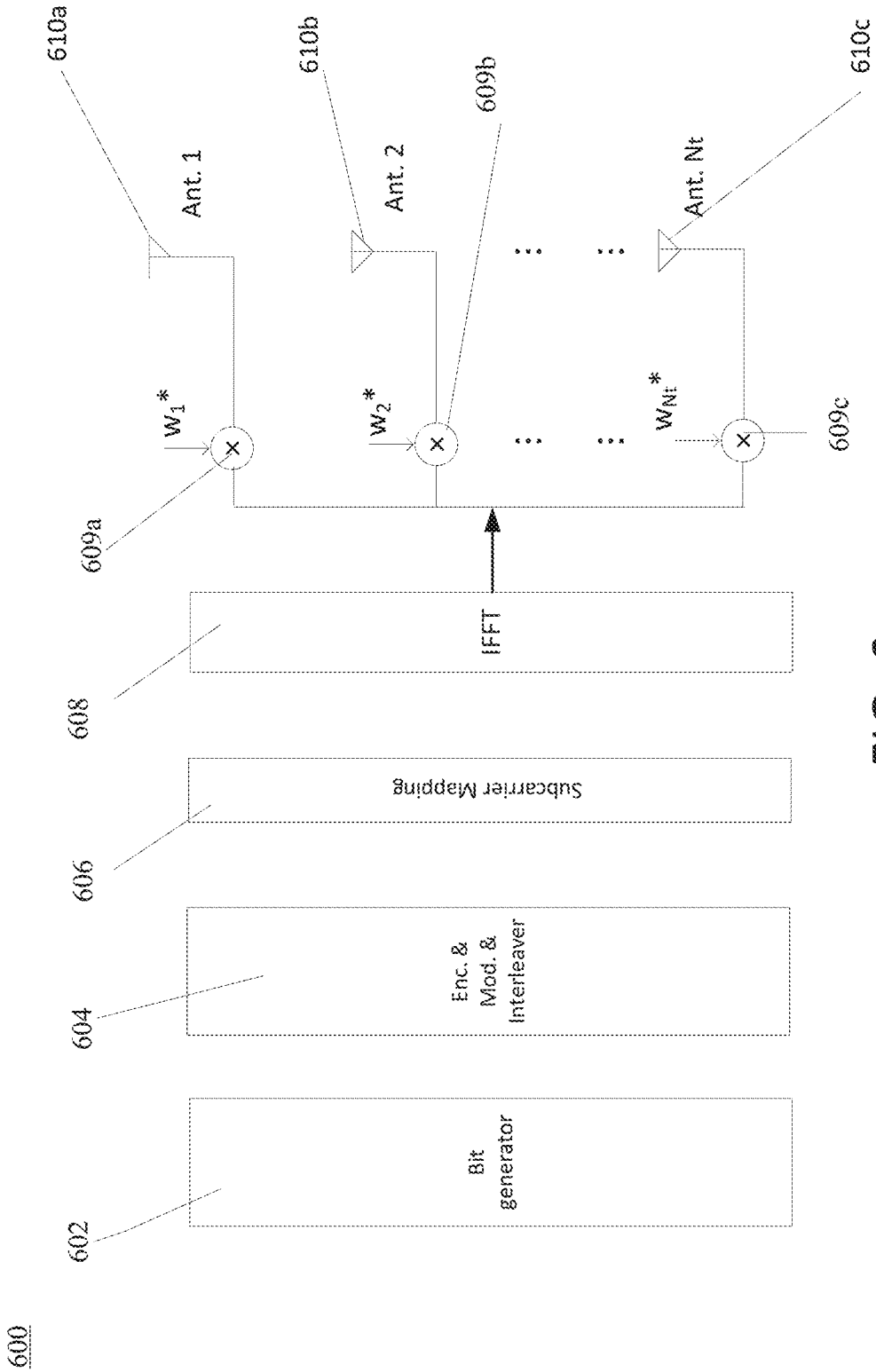
FIG. 6 is an example diagram of time domain beamforming for single user OFDM (SU OFDM).
Figure 7:
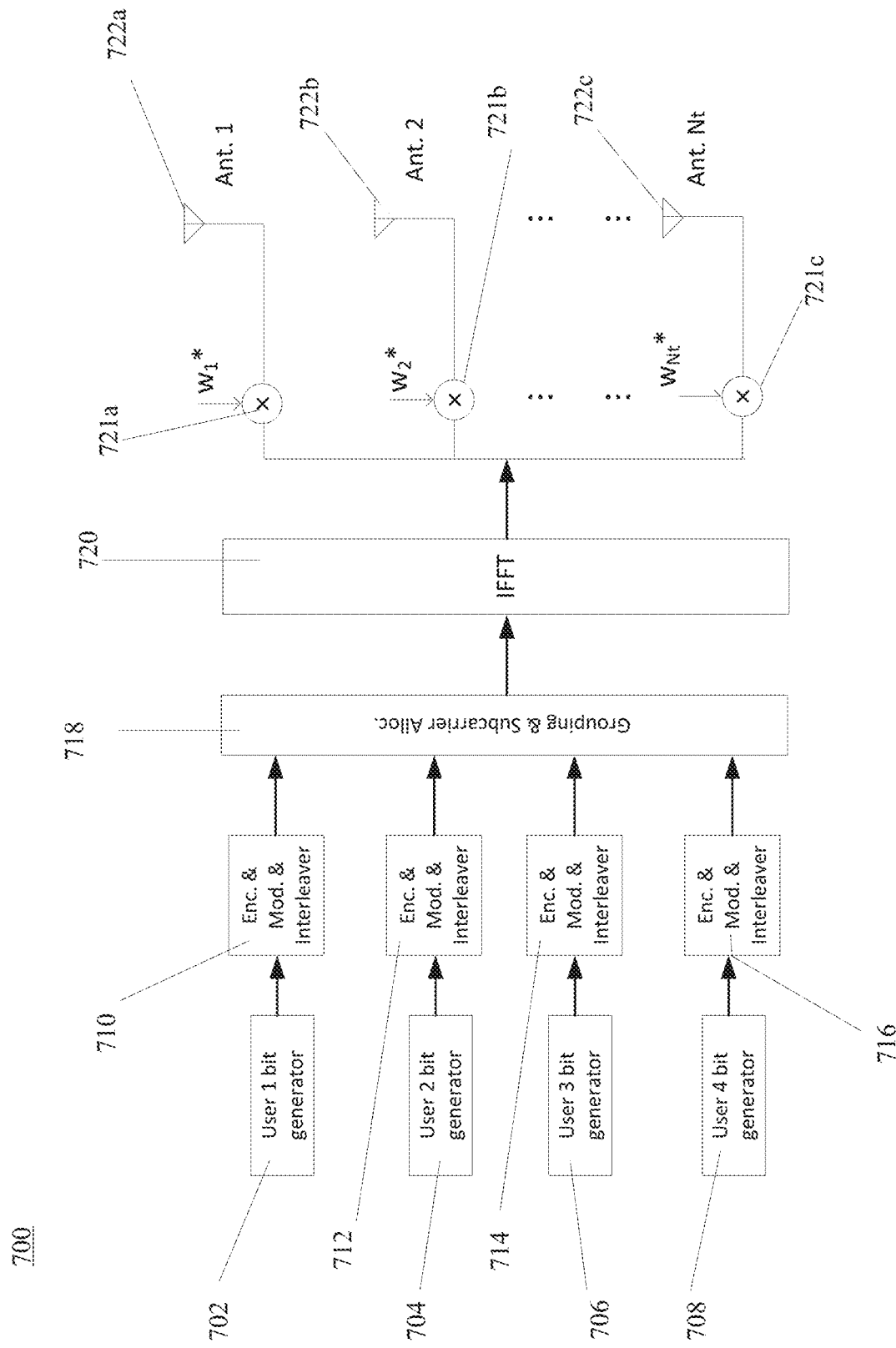
FIG. 7 is an example diagram of time domain beamforming for OFDMA.

FIG. 6 is an example diagram of time domain beamforming for SU OFDM. FIG. 7 is an example diagram of time domain beamforming for OFDMA. The single user OFDM time domain beamforming diagram is shown in FIG. 6, while the multi-user OFDMA time domain beamforming diagram is shown in FIG. 7. A system 600 for time domain beamforming for SU OFDM may include a bit generator 602, an encoder, modulator and interleaver 604, a subcarrier mapper 606, an IFFT 608, one or more multiplexers 609a, 609b, 609c that use a null forming or beam forming vector "w," and one more antennas 610a 610b, and 610c. A system 700 for time domain beamforming for OFDMA may include one or more user bit generators 702, 704, 706, 708, and an associated encoder, modulator, and interleaver 710, 712, 714, 716, as shown in FIG. 7. The system 700 may also include a grouping and subcarrier allocation 718, an IFFT 720, one or more multiplexers 721a, 721b, and 721c for null forming or beam forming with vector "w," and one or more antennas 722a, 722b, 722c. In the OFDMA case, one or more (e.g., each) of the multiple subchannel users may have its own encoding and modulation, as shown in FIG. 7. One or more (e.g., all) the modulated symbols from one or more (e.g., all) users may be allocated on associated subcarriers and transformed to time domain, for example, by IFFT. The time domain Null-forming may be performed on the time domain signal.

Single user OFDM, such as that described in FIG. 6, may be used. The last N−1 taps may be the extra channel taps that cause ISI/ICI (e.g., explicitly). The null-forming vector w may be designed such that the virtual channel on the extra channel taps (e.g., delays) may be nulled (e.g., the name null-forming). w may be derived as follows:

U may be the matrix (e.g., or vector space) spanned by the N−1 extra taps:

$$U = [h_{L+1}, h_{L+2}, \ldots, h_{L+N-1}]$$

which may be a M*(N−1) matrix. The vector w may be formed in the null space of U, such that:

$$w'^* h_{L+1} = 0;$$
$$w'^* h_{L+2} = 0;$$
$$\ldots$$
$$w'^* h_{L+N-1} = 0;$$

The overall channel (e.g., after null forming) may become:

$$\{w'^* h_1, w'^* h_2, w'^* h_3, \ldots, w'^* h_L, w'^* h_{L+1}, w'^* h_{L+2}, \ldots, w'^* h_{L+N-1}\}$$

which becomes, $$\{w'^* h_1, w'^* h_2, w'^* h_3, \ldots, w'^* h_L, 0, 0, \ldots, 0\}$$

which is an effective channel of L taps, where the last N−1 taps have been nulled. As a result, ISI/ICI may disappear. The original channel may be an M×1 vector channel per tap. The effective channel may be a 1×1 scalar channel per tap.

Figure 8:
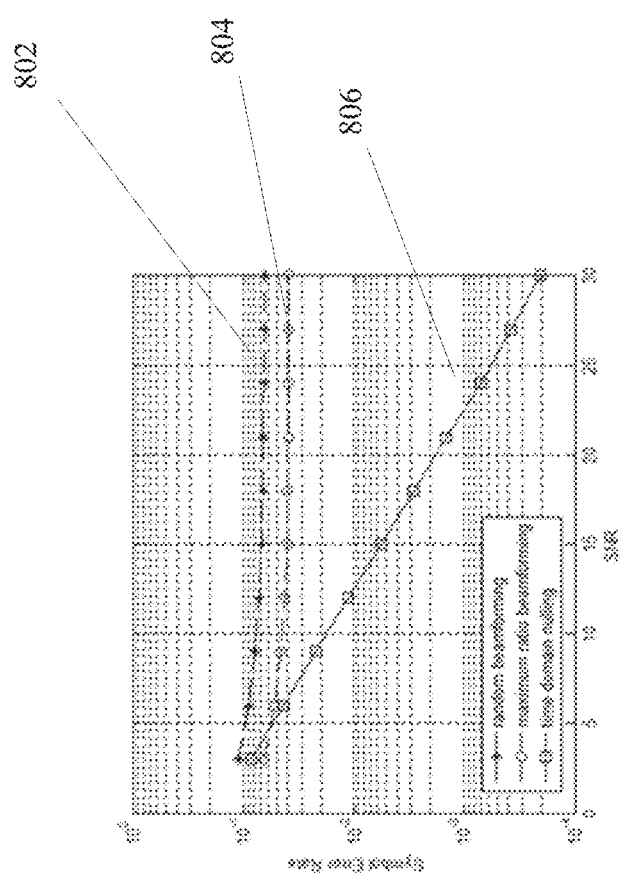
FIG. 8 is an example of using null-forming to remove self-interference.

FIG. 8 is an example of null-forming removing self-interference. FIG. 8 is a plot of symbol error rate versus signal to noise ratio (SNR) for random beamforming 802, maximum ratio beamforming 804, and time domain nulling 806. FIG. 8 shows a link level simulation result comparison, where the time domain null-forming 806 may be able to remove the self-interference (e.g., completely, such as a sign of no error floor). In FIG. 8, the maximum ratio combining operation (e.g., middle curve 804) may not remove the self-interference.

Figure 9:
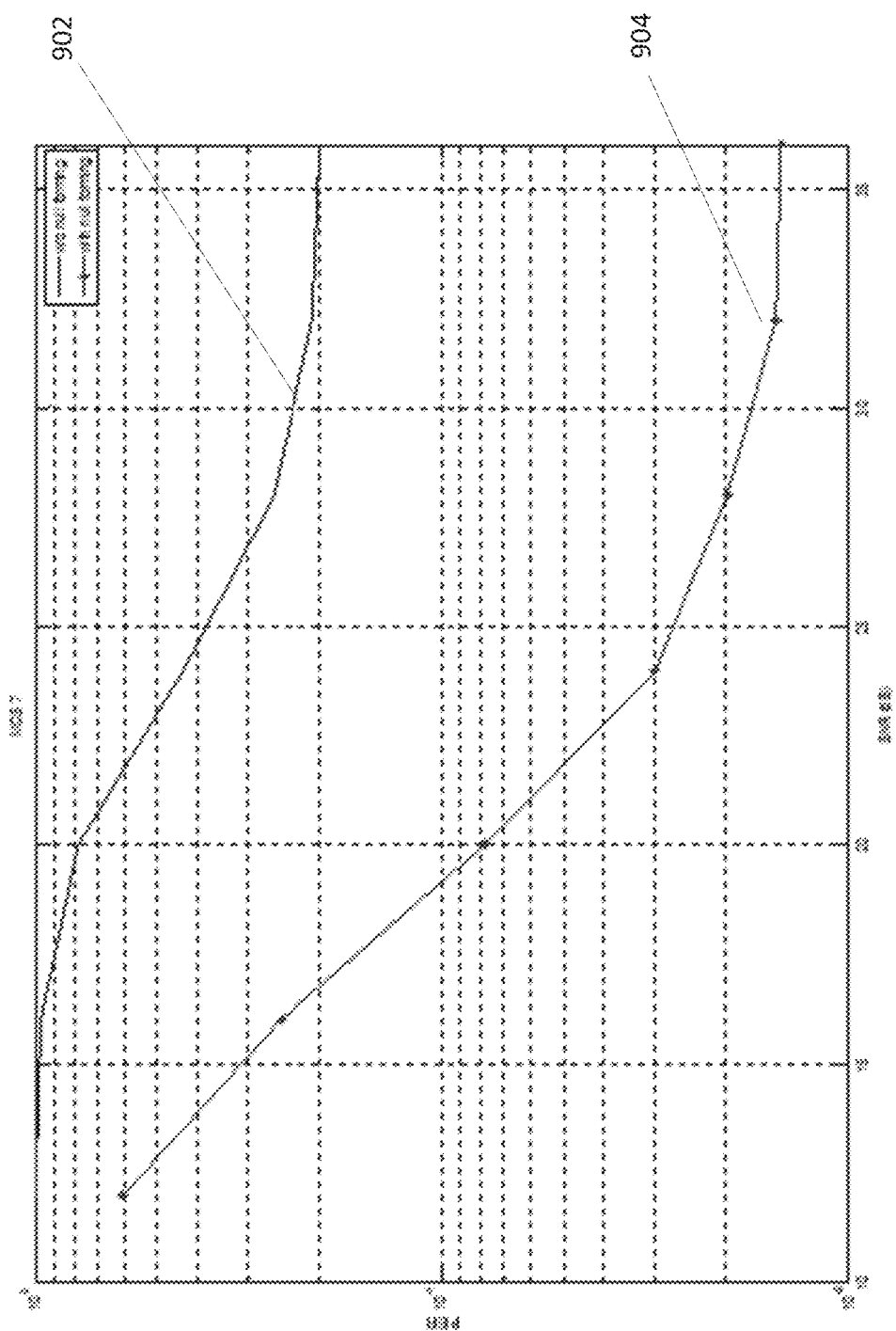
FIG. 9 is an example of using null-forming to reduce self-interference.

FIG. 9 is an example of null-forming reducing self-interference and shows another link level simulation, where the time domain null-forming 904 is able to reduce the self-interference significantly (a sign of much lower error floor). Curve 902 is without null forming and curve 904 is with null forming and the plot shows the symbol error rate versus the SNR. As FIG. 9 shows, the symbol error rate is less with time domain null forming.

To optimize performance, the null-forming vector w may be selected from the null-space to maximize a desired metric. For example, vector w may be selected to maximize the energy contained in the effective channel resulting in the following optimization subject to the null space constraint:

$$\Sigma_{i=1}^{L} |w'^* h_i|^2$$

Time domain null forming may be used. Regular data transmissions in 802.11 may use a standard GI (e.g., 0.8 microsecond). The legacy LTF may use an extended double GI (e.g. 1.6 microsecond).

Figure 10:
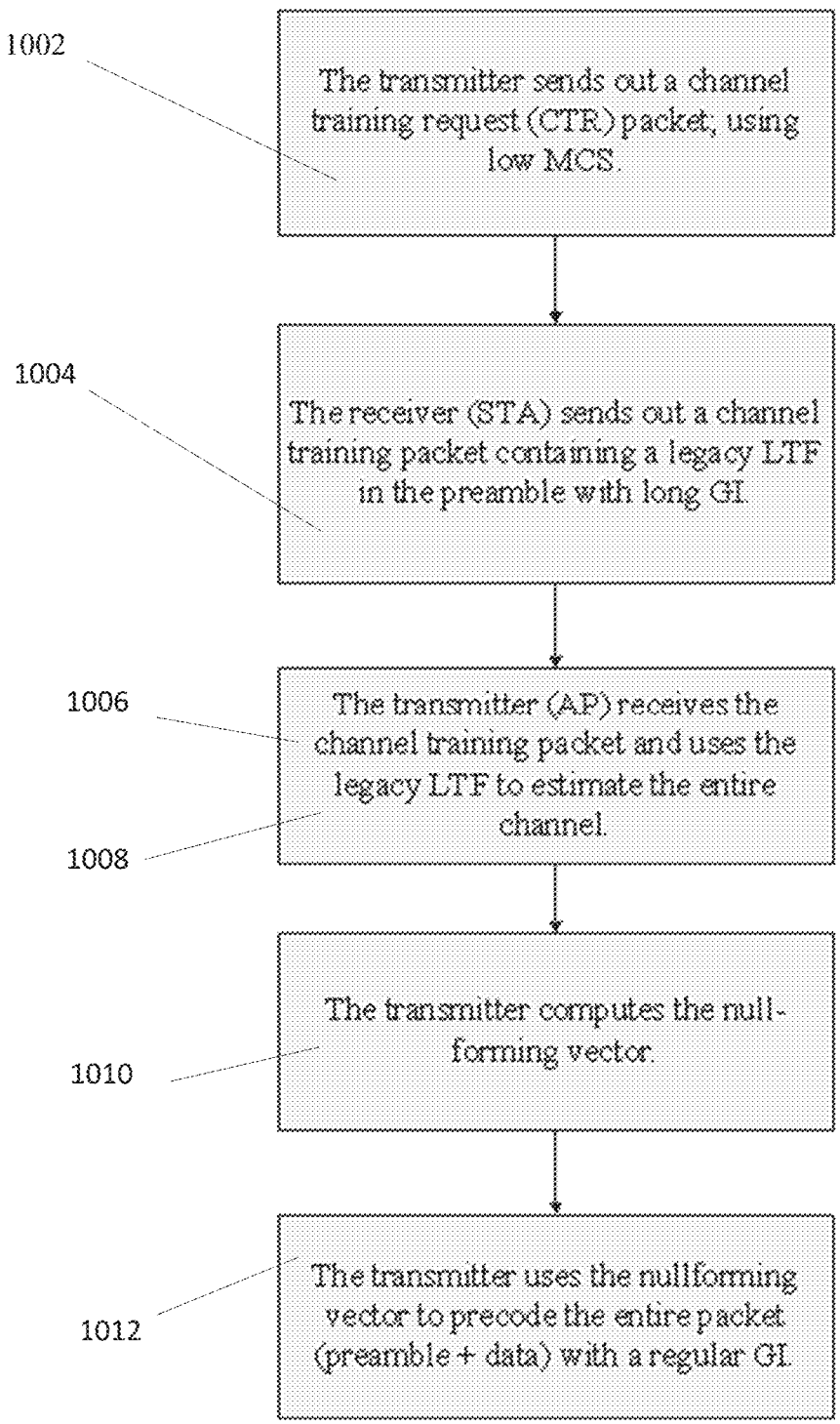
FIG. 10 is an example of time domain null forming.

FIG. 10 is an example time domain null forming algorithm. A transmitter with multiple transmit antennas and/or a receiver with a single receive antenna may utilize time domain null forming protocol. A transmitter may send out a packet to the receiver using low MCS (e.g., MCS 0) 1002. The transmitter may request channel training to be initiated by the receiver. The request may be reliably received, for example, in the presence of ISI/ICI due the low MCS being selected. A transmitter may not send out a packet to the receiver and may not request channel training to be initiated by the receiver. A receiver may receive a channel training request. Upon receiving the channel training request, the receiver (STA) may send out a channel training (e.g., control) packet containing a legacy LTF in the preamble portion 1004. The legacy LTF may contain a double GI (e.g., long GI in general) that may be able to cover up to 1.6 microsecond delay spread. The transmitter (e.g., AP) may receive the channel training packet 1006. The transmitter may use the legacy LTF to estimate the entire channel 1008. The transmitter may use the legacy LTF, for example to estimate the entire time domain channel. The transmitter may collect the channel covariance matrix from the receiver (e.g., implicitly or explicitly). The transmitter may form the null-forming vector 1010, for example, based on the channel covariance matrix. For example, the null-forming vector may be chosen to null one or more (e.g., all) eigenvectors of the channel covariance matrix. It may be sufficient to null the strongest (e.g., only the strongest) taps (e.g., several taps) exceeding the cyclic prefix length (e.g., the cyclic prefix length may be the GI). The transmitter may compute the null-forming vector, e.g., according to a criterion such as described herein. The transmitter may use the null-forming vector to precode the packet 1012 (e.g., entire packet). The transmitter may send the precoded packet to the receiver (STA) using a regular GI. The transmitter may nullform the preamble including the STF, LTF, SIG, etc. The transmitter may nullform the data portion, e.g., using the same null-forming vector.

Figure 11:
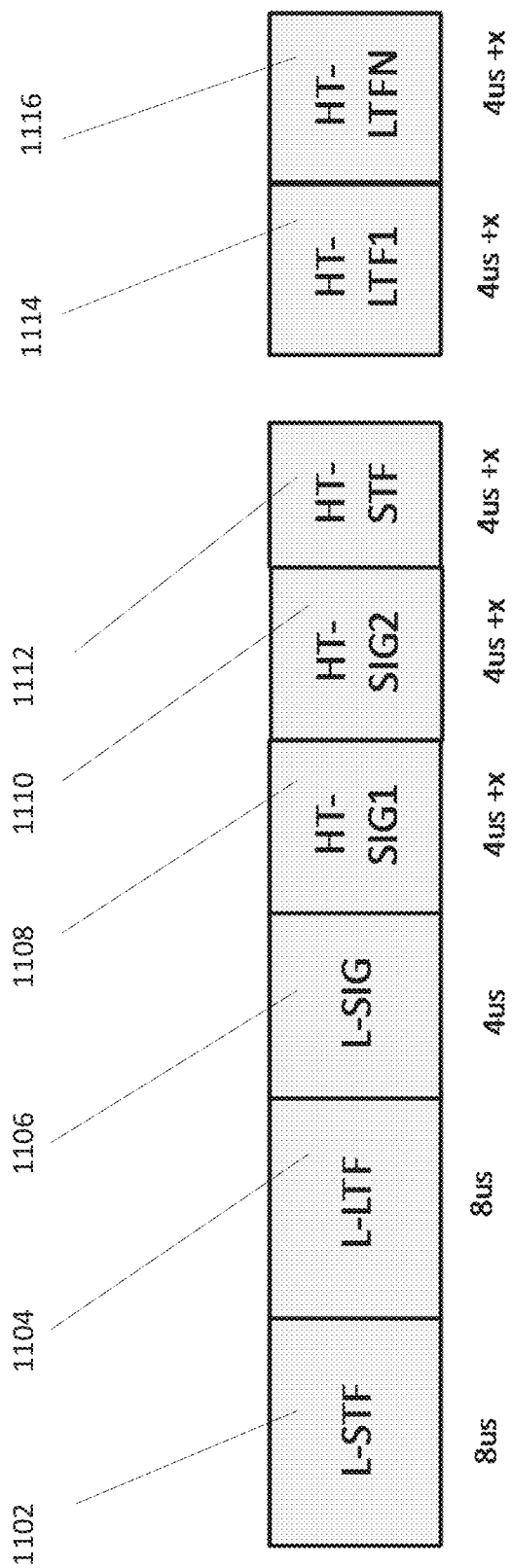
FIG. 11 is an example NDP frame with NDP-Long Delay Spread (NDP-L).
Figure 12:
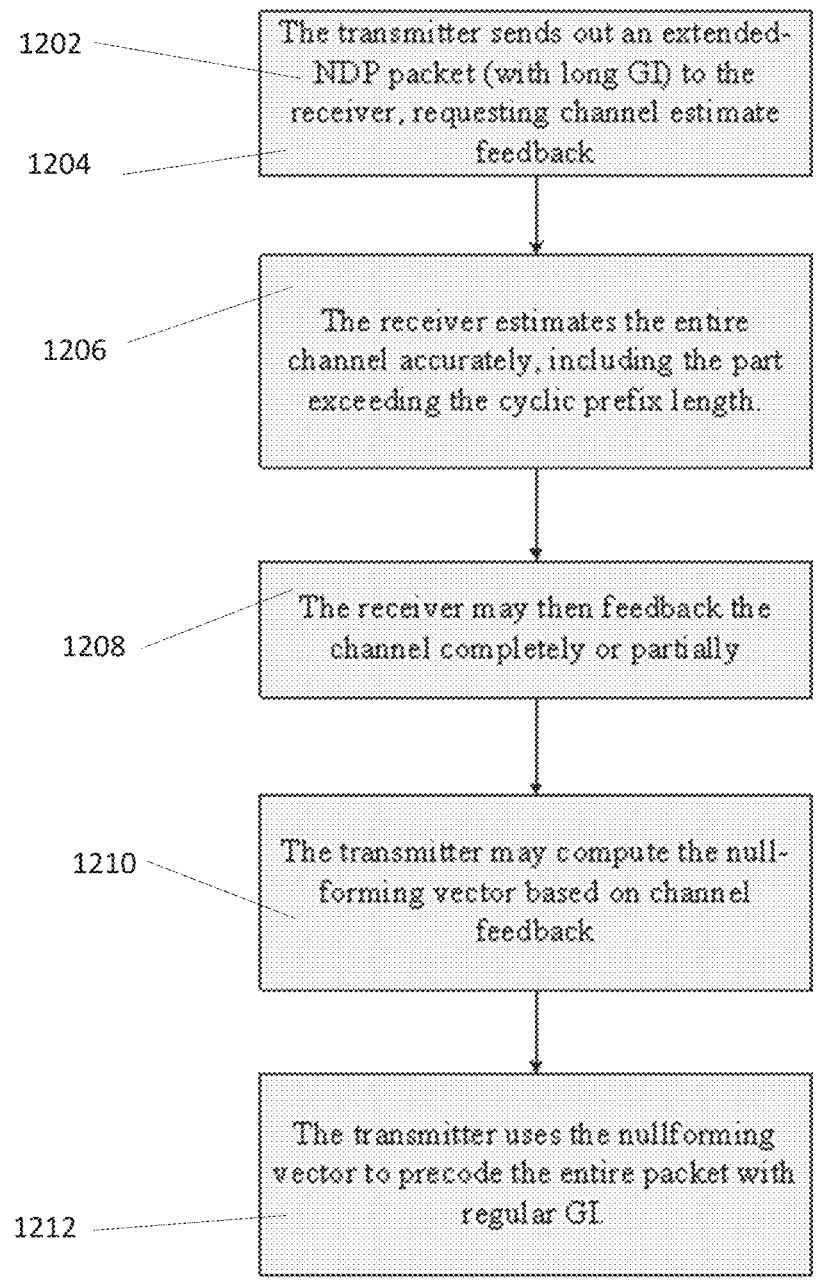
FIG. 12 is an example of time domain null forming.

FIG. 11 is an example new NDP frame 1100 and NDP-Long Delay Spread (NDP-L). The NDP frame 1100 may have an L-STF field 1102, an L-LTF subframe 1104, an L-SIG field 1106, an HT-SIG1 field 1108, an HT-SIG2 field 1110, an HT-STF field 1112, an HT-LTF1 field 1114, and an HT-LTFN field 1116. FIG. 12 is an example time domain null forming algorithm 1200. A transmitter with multiple transmit antennas and a receiver with a single receive antenna may utilize time domain null forming. The transmitter may send out an extended-NDP packet to the receiver 1202. The transmitter may request channel estimate feedback 1204. The extended NDP packet, e.g., as shown in FIG. 11, may use an extended CP in the HT-SIG1, HT-SIG2, and HT-LTF portions. The receiver may receive the extended NDP packet. Upon receiving the extended NDP packet, the receiver may estimate the entire channel 1206 (e.g., accurately), for example, including the part exceeding the cyclic prefix length. The receiver may feedback the channel (e.g., entire channel) to the transmitter 1208. The receiver may feedback the channel coefficients corresponding to the latest several taps that introduce ISI/ICI (e.g., significantly introduce ISI/ICI), for example, rather than feeding back the entire channel. The receiver may choose to feedback the channel correlation matrix corresponding to the latest several taps, for example, rather than feeding back the channel realization itself. The transmitter may compute the null-forming vector 1210 according to a criterion, such as described herein. The transmitter may use the null-forming vector to precode the packet (e.g., entire packet) 1212. The transmitter may send the precoded packet to the receiver (e.g., STA) using a regular GI. The transmitter may nullform the preamble, for example, including the STF, LTF, SIG, etc. (e.g., when sending the precoded packet to the receiver). The transmitter may nullform the data portion using the same null-forming vector (e.g., when sending the precoded packet to the receiver).

The guard interval for the preamble in 802.11ac may be 800 ns. If the short guard interval is specified, the data symbols may use a guard interval of 400 ns. If the delay spread of the channel exceeds 400 ns, but is less than 800 ns, the estimate of the time domain channel using the preamble may provide the receiver the opportunity to use this information to shorten the channel for subsequent data reception by applying null reception beamforming of the time domain channel. This may be possible (e.g., may only be possible) if the excess delay spread is 400 ns or less. If a longer symbol length is used the above parameters may be different, e.g. 800 ns, and 1.6 micro-second.

A STA, and/or AP, may use a Beamforming Report Poll (BRP) to determine if spatial channel nulling may be utilized (e.g., required). The AP may send an NDP announcement, followed by a BRP after short interframe space (SIFS) time. The STA may respond with a compressed beamforming response. The AP may use the compressed beamforming response to compute the channel delay spread and determine whether a long guard interval is sufficient for subsequent transmissions. The AP may use the compressed beamforming response to determine if the addition of channel shortening may be utilized (e.g., required).

The STA may indicate to the AP whether it supports channel shortening or not. The STA may include this indication in the compressed beamforming response described herein. The STA may include this indication explicitly in a MAC capability response field. The indication may use explicit feedback, e.g., 802.11ac explicit feedback for MU-MIMO operation.

The STA and/or the AP may leverage the reciprocity of the channel to derive an estimate of the delay spread.

Examples described herein may apply to OFDMA. In OFDMA, the null-forming vector may be derived based on channel realizations from one or more (e.g., all) users scheduled in the OFDMA resources.

Frequency domain beamforming may be used. In an example described herein, per-tone beamforming may be utilized.

When multiple antennae are available for either transmission or reception, the antenna weights may be designed to reduce ICI/ISI on a per-tone basis. Such designed antenna weights may maximize the SINR or minimize the subcarrier power leakage.

The downlink (DL) of a multiple input single output (MISO) OFDMA system may be utilized in examples described herein. An AP with N_t antennas may transmit OFDMA symbols to U single antenna stations (STA). UN modulation symbols may be carried by one OFDMA symbol for one or more (e.g., all) STAs. One or more (e.g., each) STA may receive the OFDMA symbol and decode the N intended modulation symbols on its assigned N subcarriers. The k-th OFDMA symbol may be denoted by $x(k)=[x_0(k), x_1(k), \ldots, x_{UN-1}(k)]$. To generate $x(k)$, the AP may generate U length N vectors for one or more (e.g., each) of the STA, $s_j(k), j=0, 1, \ldots, U-1$. The AP may use a UN×UN subcarrier mapping matrix $P_a$ to allocate one or more (e.g., all) the modulation symbols to the UN subcarriers, i.e., $x(k)=P_a[s_0^T(k), s_1^T(k), \ldots, s_{U-1}^T(k)]^T$. The multipath channel between transmit antenna i and the receive antenna for the j-th STA may be determined using $h_i^{(j)}=[h_i^{(j)}(0), h_i^{(j)}(1), \ldots, h_i^{(j)}(L)]^T$, $i=0, 1, \ldots, N_t-1$, where L is the channel memory length. The channel memory length L may be larger than the CP length v, which may imply interference has arisen.

The j-th STA's received signal vector $y^{(j)}(k)$ may be represented by $$y^{(j)}(k) = \sum_{i=0}^{N_t-1} H_i^{(j)} F_N M_i x(k) + \sum_{i=0}^{N_t-1} A_i^{(j)} F_N M_i x(k) + \sum_{i=0}^{N_t-1} B_i^{(j)} F_N M_i x(k-1) + n^{(j)}(k),$$

where $H_i^{(j)}$ may be a UN×UN circulant channel matrix between transmit antenna i and the receive antenna for the j-th STA with first column $[h_i^{(j)}(0), h_i^{(j)}(1), \ldots, h_i^{(j)}(L), 0, \ldots, 0]^T$, $F_N$ may be the UN×UN normalized IDFT matrix, $M_i=\text{diag}(m_i(0), m_i(1), \ldots, m_i(UN-1))$ may be the diagonal beamforming matrix for i-th antenna, $A_i^{(j)}$ and $B_i^{(j)}$, discussed herein, are the ICI and ISI matrices, and $n^{(j)}(k)$ may be the additive noise distributed as $CN(0, \sigma I)$.

Matrices $A_i^{(j)}$ and $B_i^{(j)}$ contain one or more (e.g. all) zero sub-matrices, for example, except for an upper triangular sub-matrix $S_i^{(j)}$, which may be referenced in the sequel, $$S_i^{(j)} = \begin{bmatrix} h_i^{(j)}(L) & h_i^{(j)}(L) & \ldots & h_i^{(j)}(L) \\ 0 & h_i^{(j)}(L) & \ldots & h_i^{(j)}(L) \\ \vdots & \ddots & \ddots & \vdots \\ 0 & \ldots & 0 & h_i^{(j)}(L) \end{bmatrix},$$

$$A_i^{(j)} = \begin{bmatrix} 0_{(L-v)\times(UN-L)} & S_i^{(j)} & 0_{(L-v)\times v} \\ 0_{(UN-L+v)\times(UN-L)} & 0_{(UN-L+v)\times(L-V)} & 0_{(UN-L+v)\times v} \end{bmatrix},$$

and

-continued $$B_i^{(j)} = \begin{bmatrix} 0_{(L-v)\times(UN-L+v)} & S_i^{(j)} \\ 0_{(UN-L+v)\times(UN-L+v)} & 0_{(UN-L+v)\times(L-v)} \end{bmatrix}.$$

Per-tone beamforming vectors $\overline{m}_n^{(j)}=[m_0(n), m_1(n), \ldots, m_{N_r-1}(n)]^T$ may be separately designed for the j-th STA on the n-th subcarrier, which may be exclusively assigned to modulate the symbols of the j-th STA.

The beamforming vectors $\overline{m}_n^{(j)}$ may be designed to minimize the power leakages to the assigned subcarriers of the same STA and/or other STAs. Minimizing signal to leakage power ratio (SLR) criterion may mean designing the beamforming vectors properly to maximize the signal to interference plus noise power ratio at the interested subcarriers at certain STAs. It may be observed that this criterion is different from the leakage minimizing criterion for the single user OFDM. For OFDMA, the subcarriers may be divided into subchannels and one or more (e.g., each) subchannel may be assigned for use by an individual STA. The calculation of the SLR may take into account (e.g., may only take into account) the assigned subcarriers in one or more (e.g., each) STA's entire frequency band. The power leakage to the unassigned subcarriers of one or more (e.g. each) STA may not be interested and may not affect performance. In the frequency domain beamforming, the frequency domain estimates of the assigned subcarriers of each STA may be fed back (e.g., may only be fed back).

Figure 13:
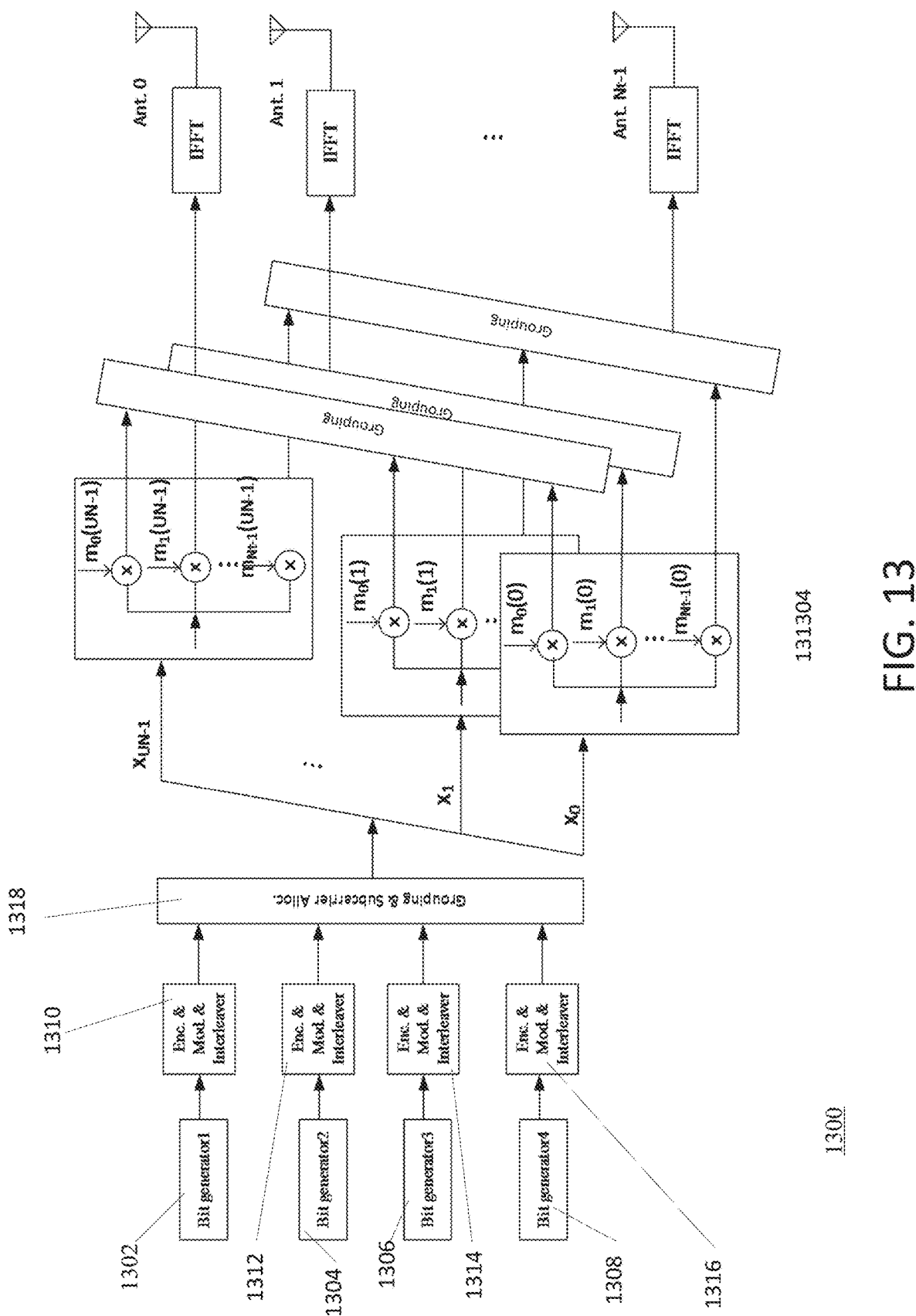
FIG. 13 is an example diagram of per-tone beamforming.

FIG. 13 is an example diagram of per-tone beamforming. An OFDMA per-tone beamforming diagram 1300 is shown in FIG. 13. Frequency domain beamforming vectors for one or more (e.g., each) subcarrier which may be pre-IFFT processing may be used. In the example 1300, there are four bit generators 1302, 1304, 1306, and 1308 with an associated encoder, modulator, and interleaver 1310, 1312, 1314 and 1316. The encoder, modulator, and interleaver 1310, 1312, 1314 and 1316 may output to a grouping and subcarrier allocation 1318. Examples described herein may utilize a common time domain beamforming vector for the post-IFFT signal. Flexibility in beamforming designs may be utilized, for example, since more degrees of freedom in frequency domain may be exploited. With frequency domain beamforming vectors (e.g., optimal frequency domain beamforming vectors), a better performance in terms of ICI and ISI suppression may be expected compared to the other examples of time domain beamforming described herein. The computational complexity may be higher than the time domain beamforming in exchange for the improved performance.

Figure 14:
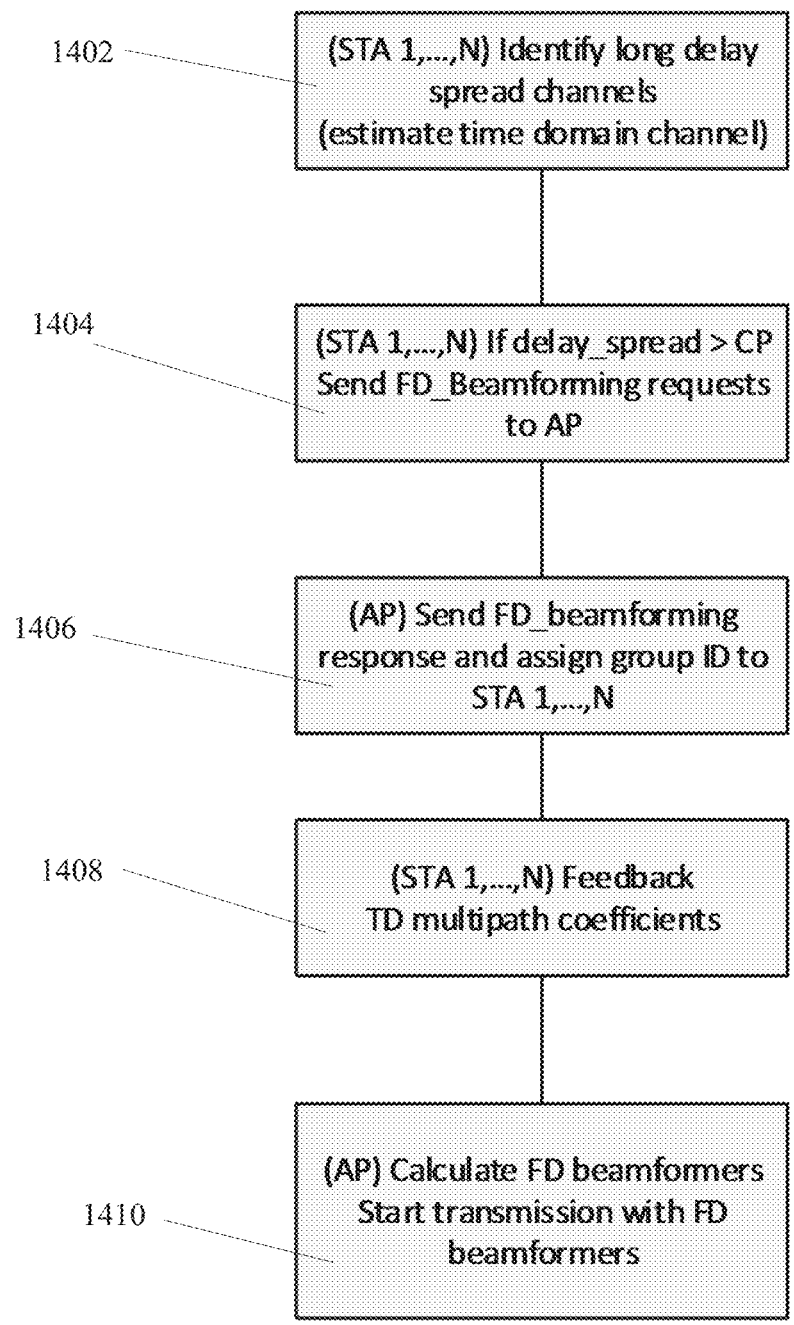
FIG. 14 is an example of frequency domain (FD) Beamforming.

FIG. 14 is an example for frequency domain (FD) beamforming 1400. In FD beamforming 1400, each STA (1, . . . , N) may identify 1402 a long delay spread channel or estimate time domain channel. Each STA (1, . . . N) may determine 1404 if the delay spread is greater than the Send FD-Beamforming requests to the AP. At 1406, the AP may send a FD_Beamforming response and assign a group identification (ID) to the STAs (1, . . . , N). The STAs may determine feedback time domain multipath coefficients 1408. The AP may calculate FD beamformers and start transmission with frequency domain beamformers 1410. For example, one or more (e.g., each) of the N STAs may estimate its own time-domain channel from its frequency domain transmission. Since the frequency domain beamforming may apply (e.g., directly apply) to the single user beamforming case, the multi-user is described herein. The single user may be obtained by considering N is equal to one. An STA i, i=1, 2, . . . , N, may perform the time domain estimation if it may find it difficult to decode any of the control packets (e.g., such as the beacon). An STA i, i=1, 2, . . . , N, may perform the time domain estimation if it may be able to decode the beacon and/or other control channels and finds that it may be able (e.g., may only be able) to transmit at the lowest MCS. For example, in FIG. 3, only the lowest MCS has reasonable performance in the large delay spread (UMi) channel. The STA may transforms its frequency domain estimate to the time domain. The STA may find that the delay spanned by the channel may be close to the CP or GI length. One or more (e.g., each) of the N STAs may send its own signal indicating that it desires and/or needs frequency domain beamforming to the AP. The STA may send a FD Beamforming feedback request to the AP. At a SIFS interval, the AP may send a Frequency Domain Beamforming response to the one or more (e.g., all) the N STA. The AP may assign the N STAs a common group ID, for example, which indicates the STA may work in a frequency domain beamforming group. One or more (e.g., each) of the N STAs may feedback the desired and/or required information to the AP using its allocated subcarriers. The feedback may be feedback of the entire time domain channel and/or feedback of the frequency domain estimates of the assigned subchannel of one or more (e.g., each) STA. The feedback may re-use the explicit feedback proposed for MU-MIMO in 802.11ac. The AP may use the time domain feedback received from one or more (e.g., all) the N STAs to calculate the frequency beamformers at one or more (e.g., each) subcarriers.

Control Frames for time domain (TD)/FD Beamforming may be used|. Control or management frames may be used to support operation on outdoor channels. For example, frame designs for TD/FD Beamforming Request frame, TD/FD Beamforming Response frame, and TD/FD Beamforming Report frame may be used. The designs may utilize the HEW action frame format. HEW may refer to High Efficiency WLAN, which may represent the next generation WLAN system (e.g., or systems compliant to 802.11 ax and beyond). One or more action frame formats may be used to support HEW functionality. A HEW action field, in the octet after (e.g., immediately after) the Category field, may be used to differentiate the HEW Action frame formats. HEW action frame may be utilized for frame designs. Other possible extended management frames and/or control frames may be utilized to carry the same information.

The HEW action field may contain a value, for example, which may indicate Outdoor Channel Operation.

TABLE 1

Example HEW Action Field

| Value | Meaning | Time Priority |
|---|---|---|
| n | Outdoor Channel Operation | Yes |

The HEW Outdoor Channel Operation frame may be an Action frame of category HEW. The Action field of a HEW Outdoor Channel Operation frame may include the information shown in Table 2.

TABLE 2

Example Action field of HEW Outdoor Channel Operation Frame

| Order | Information |
|---|---|
| 1 | Category |
| 2 | HEW Action |
| 3 | HEW Outdoor Channel Control |
| 4 | HEW Outdoor Beamforming Report |

The category may be set to the value for HEW. The HEW Action may be set to HEW Outdoor Channel Operation. The HEW Outdoor Channel Control field may be (e.g., may be always) present in the action field. According to the value specified in HEW Outdoor Channel Control field, the HEW Outdoor Beamforming Report field may present.

The HEW Outdoor Channel Control field may be defined using: the number of transmit antennas, channel width, frame role, mu mode, beamforming type, channel feedback type, feedback resolutions, the number of channel taps, and/or out of cp taps. The number of transmit antennas may be used to indicate the number of transmit antennas of the transmitter of current packet. The channel width may be used to indicate the channel width for which the measurement to create the TD/FD beamforming feedback was made. The frame role may be used to indicate whether this is a TD/FD Beamforming Request frame, TD/FD Beamforming Response frame, or TD/FD Beamforming Report frame. The MU mode may be used to indicate whether this is for single user transmission or multi-user transmission. If it is a multi-user transmission, the MU mode may indicate which mode is utilized. For example, the MU mode could be 0 for SU, 1 for OFDMA, 2 for MU-MIMO, 3 for multi-user time domain aggregation. The beamforming type may be used to indicate TD or FD beamforming. The channel feedback type may be used to indicate frequency domain channel feedback or time domain channel feedback. The feedback resolutions may be used to indicate the resolutions of the feedback, such as the number of bits used for each feedback parameter. One or more level of resolutions may be described herein. The number of channel taps may be used to indicate the number of time domain channel taps. The out of CP taps may be used to indicate number of out of CP taps requested or reported. The number of taps which are out of the CP may also be indicated using this field.

TABLE 3

Example of HEW Outdoor Channel Control field.

| # of Transmit antennas | Channel Width | Frame Role | MU mode | Beamforming Type | Channel Feedback Type | Feedback Resolutions | # of Ch taps | Out of CP taps |
|---|---|---|---|---|---|---|---|---|

The HEW Outdoor Beamforming Report may be present when the Frame Role sub-field in HEW Outdoor Channel Control field indicates the TD/FD Beamforming Report frame. According to the Channel Feedback type in HEW Outdoor Channel Control field, time domain channel feedback or frequency domain channel feedback may be given in HEW Outdoor Beamforming Report.

With time domain channel feedback, the HEW Outdoor Beamforming Report field may comprise a complex channel matrix with size Nt×Nr×Ntap, and a real tap position vector with size Ntap×1. Nt may be the number of transmit antennas, Nr may be the number of receive antennas and Ntap may be the number of time domain taps. The complex and real numbers may use the resolution defined in Feedback Resolutions subfield. Other feedback formats that may use a smaller number of feedback bits may be utilized.

Outdoor operation capability fields may be used. A HEW Capability info field may be defined and/or transmitted by management frames, such as Beacon frame, Probe Response frames and/or Association response frames, etc. The HEW capability element may comprise one or more of: an element ID, a Length field, HEW capabilities info field, and Supported HEW-MCS and NSS set filed. In the HEW Capability info field, one or more subfields may be used to signal outdoor operation capability, such as TD Beamformer capable, TD beamformee capable, FD beamformer capable, FD beamformee capable, multiple cyclic prefix capable, outdoor channel estimation capable, etc.

Outdoor operation capabilities may be signaled using an Outdoor Operation Information Element. The Outdoor Operation Information Element may comprise one or more of the following: an element ID field, a length field, or an outdoor operation measurement reporting information capabilities field. The outdoor operation measurement reporting information capabilities field may be used to report the capabilities for outdoor channel measurements and supporting for TD/FD beamforming.

The terminology HEW that may be used herein may be replaced by other terminologies.

STA specific cyclic prefixes for indoor and outdoor transmission may be utilized to identify STAs with large delay spread channels in mixed mode.

Using a longer CP may address large delay spread. For example, a delay spread of 3.2 micro second may be used. In this case, the OFDM symbol period (e.g., originally 3.2 micro second) may be expanded longer to ensure the CP overhead is not too large. For example, when a CP length of 3.2 micro second is used, the OFDM symbol period may be chosen as 12.8 micro second. For example, when a CP length of 1.6 micro second is used, the OFDM symbol period may be chosen as 6.4 micro second. For example, when a CP length of 0.8 micro second is used, the OFDM symbol period may be chosen as 3.2 micro second. For example, when a CP length of 6.4 micro second is used, the OFDM symbol period may be chosen as 25.6 micro second.

The ability to use a shorter CP for indoor operation such as the existing CP of 800 nano seconds may be maintained. This may be accomplished by using four 5 MHz channels in an OFDMA waveform each with a CP length of 800 nano seconds, wherein the composite 20 MHz channel has a CP length of 3.2 micro second. Eight 2.5 MHz channels may be used in an OFDMA waveform wherein each has a CP length of 400 nano seconds, wherein the composite 20 MHz channel has a CP length of 3.2 micro seconds.

One or more (e.g., each) STAs may identify an optimal CP length for transmission to a STA, or group of STAs, for example, within a particular orthogonal wireless channel. A multi-stage GI length may be utilized with a short GI, normal GI, and a long GI in which the size of the GI desired is requested (e.g., explicitly requested by the STA) or the size of the long GI is fixed by a standards body. As described herein, a multi-stage GI length may be utilized with a variable length GI where the size of the GI may be requested (e.g., explicitly requested) by the STA. This is different than the blind GI setting between the short GI and normal GI that exists in 802.11 today. The solution allows for properly setting the required GI while maintaining backwards compatibility with legacy STAs.

An orthogonal wireless channel may be understood to be a channel that is shared and/or used by one or more STAs, for example, without the possibility of interference from APs, and STAs, that may not be a part of transmissions or receptions within the said channel. For example, an Omni antenna transmission wireless channel may be a channel wherein one or more (e.g., all) STAs for which communications may be taken belong to an Omni channel (e.g., a single Omni channel). A beam formed by beamforming at the AP may be considered an orthogonal channel for STAs that may be comprised in the beam. The channel used may be an orthogonal wireless channel or may be the general wireless channel used for transmission.

A CP length (e.g., optimal CP length) for transmission may be based on the delay spread of the wireless channel with which the transmission may be intended. The AP may be informed by feedback (e.g., explicit feedback) and/or by piggybacking the information on subsequent transmissions between the AP and STA(s) of the delay spread and/or similar relevant channel state information of the orthogonal wireless channel (e.g., that may be used in non-orthogonal channels).

One or more of the following may be performed: CP length discovery/probing, feedback, or data and control frame transmission.

CP length discovery/probing may be used. In CP length discovery/probing, the AP may probe the network to find the desired GI for one or more (e.g., each) STA in the BSS. One or more of the following may be performed. One or more (e.g. each) STA may generate a time domain channel estimate of any frame received. A specific frame exchange may not be needed, for example, as the STA may know its delay spread in relation to the GI. This may be possible by the use of the Legacy Long Training Field (L-LTF) to perform the channel estimation. CP discovery may be initiated, for example, in which the AP may send out a CP discovery request to the network (e.g., entire network) within the wireless channel using an available CP (e.g., the largest CP available) and/or a modified NDP, as described herein. The STA may be informed (e.g., implicitly informed) to estimate the delay spread of the channel in the time domain to prevent any problems that may arise due to estimating a channel with a longer delay spread than the CP in the frequency domain. A CP discovery frame may be sent by the AP over the orthogonal wireless channel. The AP may send out a known frame in which OFDM symbols (e.g., successive OFDM symbols) are coded (e.g., independently coded) and may be sent with smaller (e.g., progressively smaller) CP lengths. Decoding failure may be indicated by a frame check sequence (FCS) failure for a specific OFDM symbol. Decoding failure may indicate that the GI is too small. For example, when there is long GI length of 1.6 msec, a normal GI length of 0.8 msec and/or a short GI of 0.4 msec, the AP may send out 3 OFDM symbols. If the delay spread is between 0.4 and 0.8 msecs, the third symbol may fail. The CP length of long GI (e.g., 1.6 uS for 3.2 uS frame), or double than the long GI (e.g., 3.2 uS for 3.2 uS frame) may be sent, for example, ensuring no ISI at receivers. This may be used at the receiver to calculate a time-domain channel (e.g., accurate time-domain channel) as described herein. Using this channel along with a noise threshold may give an accurate estimate of the maximum delay spread. The AP may send out a schedule for soliciting the CP discovery feedbacks from one or more (e.g., all) the associated STAs. The AP may request the CP discovery feedback simultaneously using PHY technique like uplink-OFDMA or uplink-MU-MIMO to reduce the overhead.

Feedback may be utilized for CP length discovery/probing. One or more of the following may be performed. One or more (e.g., each) STA(s) may feedback information on its desired CP length to the transmitter. For example, to simplify the feedback, it may be quantized based on the number of CP lengths available. For example, when there is a long GI length of 1.6 msec, a normal GI length of 0.8 msec and/or a short GI of 0.4 msec, this may be a 2-bit field indicating the desired GI. This may be by a dedicated CP feedback frame and/or a set of bits in the PHY SIG. The feedback may be piggy-backed on any returning transmission. The AP may poll specific STA(s) for their feedback and/or the AP may set up a feedback contention window in which one or more (e.g., all) STAs are supposed to feedback only the CP length information. If AP has sent out a schedule for feedback, one or more (e.g., all) of the STAs that are part of the schedule may send the feedback according to that schedule, for example, one after other. If the AP has requested feedback simultaneously, STAs may use appropriate (e.g., requested) PHY technique to feedback the CP length simultaneously.

Data and control frame transmission may utilize the different CP lengths in different ways. One or more of the following may be performed. The AP may transmit to one or more (e.g., each) STA or group of STAs using its or their desired CP length. The AP may send data frames to the STA with the desired GI, for example, to optimize the GI overhead. The control frame transmission or frame preambles (e.g., intended for one or more or all the STAs in the network) may be sent with the largest CP (e.g., largest CP required). Alternatively, control frames (e.g., and frame preambles) may be transmitted with the lowest MCS allowed, for example, to ensure that the control frame may be decoded even in the presence of large delay spread channels. A CP field may be added to the SIG in the preamble to indicate the CP length used. In multi-user transmission that may require grouping (e.g., OFDMA type transmissions and/or multiple antenna type transmissions), two approaches may be possible. For example, STAs may be assigned to groups in such a manner that ensures that STAs that utilize similar CP lengths that are grouped together for transmission. For example, STAs may be assigned to groups independent of the CP length utilized by the STA and the transmission used may transmit the largest CP length utilized in the group. For uplink transmission, this largest CP length may be communicated to one or more (e.g., all) of the STAs in the group. This may require a handshake procedure in which the frame assigning the STAs to the multi-user transmission may include the CP length to be used.

Channel estimation for long delay spread channels with multiple transmit antennas may be used. The NDP frame may be modified by increasing the CP length to a level that may be suitable for the cell or BSS (e.g., entire cell). The CP length may be increased from 0.8 usec to 1.6 usec to use the same length as the L-LTF. A smaller CP length, for example, between 0.8 usec and 1.6 usec, may be used to reduce the overhead. Note that variable CP lengths may also be permitted.

Figure 15:
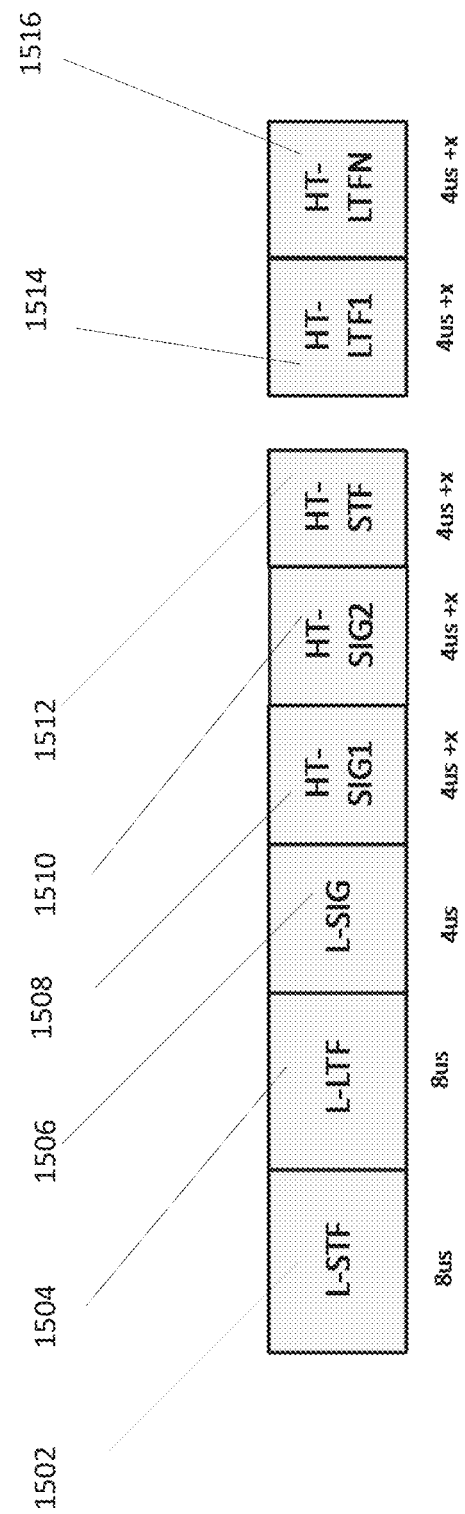
FIG. 15 is an example NDP frame with NDP-long delay spread (NDP-L).

FIG. 15 is an example NDP frame 1500 and NDP-long delay spread (NDP-L). The NDP frame 1500 may include an L-STF field 1502, an L-LTF field 1504, an L-SIG field 1506, an HT-SIG1 field 1508, an HT-SIG2 field 1510, an HT-STF field 1512, and HT-LTF-1 field 1514, and an HT-LTFN field 1516. The L-SIG may be kept at 4 us, for example, to enable legacy STAs decode it. As the L-SIG may be sent with ½ rate binary convolutional code using BPSK modulation, the probability that it is decodable by the STAs with long delay spread may be high, for example, as shown in FIG. 2.

To enable the use of the new NDP frame the following procedure may be used. In CP length discovery/probing, the AP may probe the network to find the desired GI for one or more (e.g., each) STA in the BSS. For example, the AP may send out a CP discovery frame requesting one or more (e.g., all) STAs estimate the delay spread. The STAs may do this (e.g., may be required to do this) with one or more (e.g., every) frame received. The GI estimation may be done by one or more (e.g., each) STA estimating the delay spread of the channel using the L-LTF and/or identifying if the delay spread exceeds the CP length. The GI estimation may be done by the AP estimating the CP length from an uplink transmission using the L-LTF.

The STAs may send back a CP response frame to the AP (e.g., in the case described herein where the GI estimation may be done by each STA estimating the delay spread of the channel using the L-LTF and identifying if the delay spread exceeds the CP length). To reduce the feedback overhead, STAs (e.g., only STAs) that may utilize larger CPs than the current default in 802.11 (e.g., 0.8 usec) may send back information. STAs (e.g., all the STAs) may feedback their desired CP to the AP. The AP may poll one or more (e.g., all) associated STAs to request the desired CP length and/or the STAs may piggyback this information on any uplink transmission they have. The STA may send this information when it makes an association request in the event that it wants to associate with the AP.

There may be no feedback from the STA to the AP (e.g., in the case described herein where the GI estimation may be done by each STA estimating the delay spread of the channel using the L-LTF and identifying if the delay spread exceeds the CP length). The AP may identify specific STAs whose channels exceed the CP and send a signal to the identified STAs to inform them that it is modifying their transmission parameters.

During channel sounding, the AP may send an NDP announcement specifying the use of the new NDP Announcement-Long (NDP-AL) frame. The announcement may specify that the new NDP-AL may be used (e.g., in the case where x is fixed). The NDP-A may specify the new NDP-AL and/or the corresponding value of x (e.g. in the case where x is parameterized). The NDP-AL frame may be directed to specific STAs or may be directed to all the STAs in the BSS. The AP may decide to set a new CP length for one or more (e.g., all) the STAs in its BSS and/or poll one or more (e.g., all) the associated STAs to feedback information based on one NDP transmission. The transmission to mitigate the excess delay spread may be used as discussed herein.

Although the features and elements of the present invention are described in the examples in particular combinations, each feature or element may be used alone without the other features and elements of the examples or in various combinations with or without other features and elements of the present invention.

Although the solutions described herein consider 802.11 specific protocols, it is understood that the solutions described herein are not restricted to this scenario and are applicable to other wireless systems as well.

Although SIFS is used to indicate various inter frame spacing in the examples of the designs and procedures, all other inter frame spacing such as RIFS or other agreed time interval could be applied in the same solutions.

Figure 16A:
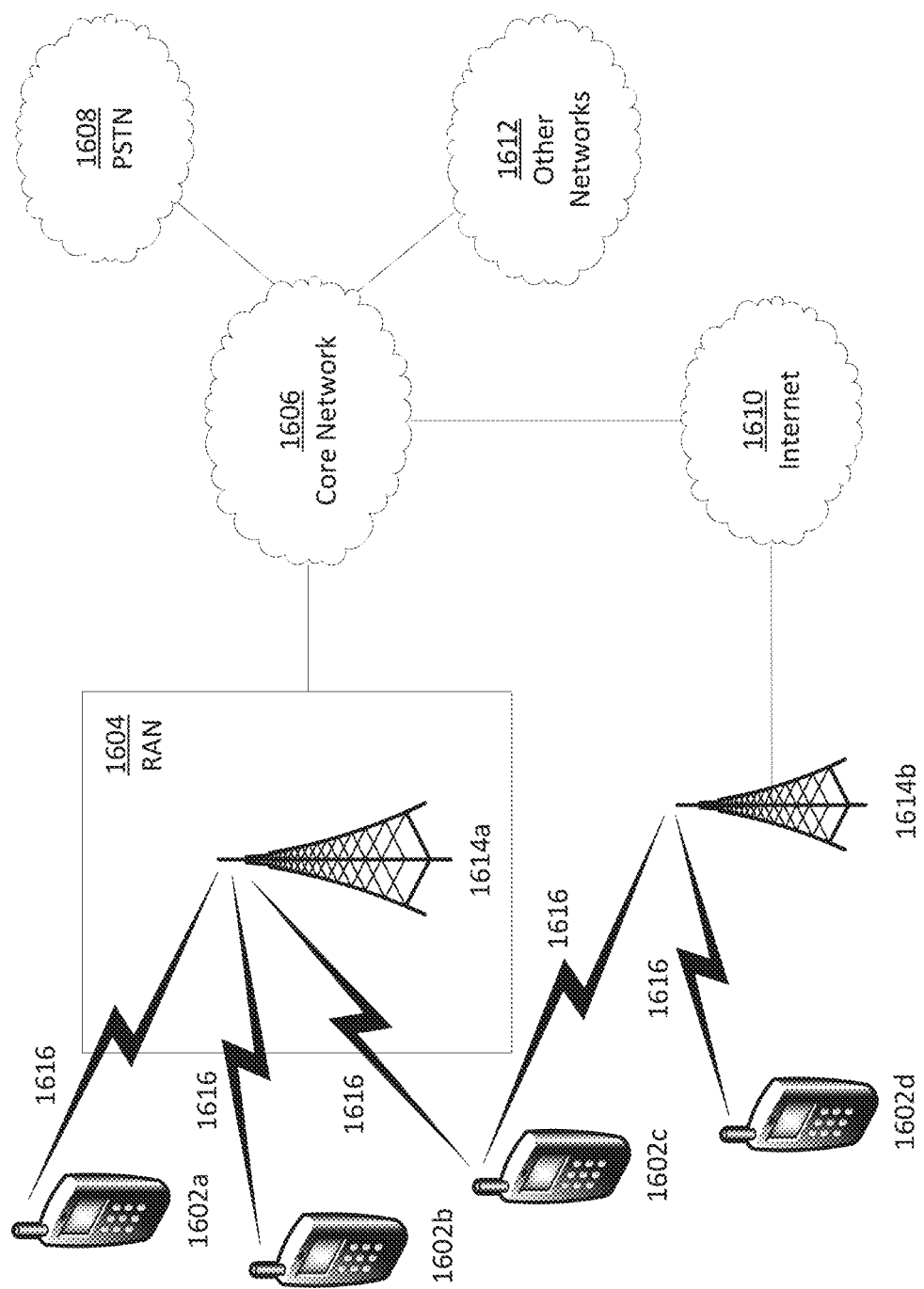
FIG. 16A is a diagram of an example communications system in which one or more disclosed embodiments may be implemented.

FIG. 16A is a diagram of an example communications system 1600 in which one or more disclosed embodiments may be implemented. The communications system 1600 may be a multiple access system that provides content, such as voice, data, video, messaging, broadcast, etc., to multiple wireless users. The communications system 1600 may enable multiple wireless users to access such content through the sharing of system resources, including wireless bandwidth. For example, the communications systems 1600 may employ one or more channel access techniques, such as code division multiple access (CDMA), time division multiple access (TDMA), frequency division multiple access (FDMA), orthogonal FDMA (OFDMA), single-carrier FDMA (SC-FDMA), and the like.

As shown in FIG. 16A, the communications system 1600 may include at least one wireless transmit/receive unit (WTRU), such as a plurality of WTRUs, for instance WTRUs 1602a, 1602b, 1602c, and 1602d, a radio access network (RAN) 1604, a core network 1606, a public switched telephone network (PSTN) 1608, the Internet 1610, and other networks 1612, though it should be appreciated that the disclosed embodiments contemplate any number of WTRUs, base stations, networks, and/or network elements. Each of the WTRUs 1602a, 1602b, 1602c, 1602d may be any type of device configured to operate and/or communicate in a wireless environment. By way of example, the WTRUs 1602a, 1602b, 1602c, 1602d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 1600 may also include a base station 1614a and a base station 1614b. Each of the base stations 1614a, 1614b may be any type of device configured to wirelessly interface with at least one of the WTRUs 1602a, 1602b, 1602c, 1602d to facilitate access to one or more communication networks, such as the core network 1606, the Internet 1610, and/or the networks 1612. By way of example, the base stations 1614a, 1614b may be a base transceiver station (BTS), a Node-B, an eNode B, a Home Node B, a Home eNode B, a site controller, an access point (AP), a wireless router, and the like. While the base stations 1614a, 1614b are each depicted as a single element, it should be appreciated that the base stations 1614a, 1614b may include any number of interconnected base stations and/or network elements.

The base station 1614a may be part of the RAN 1604, which may also include other base stations and/or network elements (not shown), such as a base station controller (BSC), a radio network controller (RNC), relay nodes, etc. The base station 1614a and/or the base station 1614b may be configured to transmit and/or receive wireless signals within a particular geographic region, which may be referred to as a cell (not shown). The cell may further be divided into cell sectors. For example, the cell associated with the base station 1614a may be divided into three sectors. Thus, in one embodiment, the base station 1614a may include three transceivers, e.g., one for each sector of the cell. In another embodiment, the base station 1614a may employ multiple-input multiple output (MIMO) technology and, therefore, may utilize multiple transceivers for each sector of the cell.

The base stations 1614a, 1614b may communicate with one or more of the WTRUs 1602a, 1602b, 1602c, 1602d over an air interface 1616, which may be any suitable wireless communication link (e.g., radio frequency (RF), microwave, infrared (IR), ultraviolet (UV), visible light, etc.). The air interface 1616 may be established using any suitable radio access technology (RAT).

More specifically, as noted above, the communications system 1600 may be a multiple access system and may employ one or more channel access schemes, such as CDMA, TDMA, FDMA, OFDMA, SC-FDMA, and the like. For example, the base station 1614a in the RAN 1604 and the WTRUs 1602a, 1602b, 1602c may implement a radio technology such as Universal Mobile Telecommunications System (UMTS) Terrestrial Radio Access (UTRA), which may establish the air interface 1616 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 1614a and the WTRUs 1602a, 1602b, 1602c may implement a radio technology such as Evolved UMTS Terrestrial Radio Access (E-UTRA), which may establish the air interface 1616 using Long Term Evolution (LTE) and/or LTE-Advanced (LTE-A).

In other embodiments, the base station 1614a and the WTRUs 1602a, 1602b, 1602c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856). Global System for Mobile communications (GSM), Enhanced Data rates for GSM Evolution (EDGE), GSM EDGE (GERAN), and the like.

The base station 1614b in FIG. 16A may comprise a wireless router, Home Node B, Home eNode B. or access point, for example, and may utilize any suitable RAT for facilitating wireless connectivity in a localized area, such as a place of business, a home, a vehicle, a campus, and the like. In one embodiment, the base station 1614b and the WTRUs 1602c, 1602d may implement a radio technology such as IEEE 802.11 to establish a wireless local area network (WLAN). In another embodiment, the base station 1614b and the WTRUs 1602c, 1602d may implement a radio technology such as IEEE 802.15 to establish a wireless personal area network (WPAN). In yet another embodiment, the base station 1614b and the WTRUs 1602c, 1602d may utilize a cellular-based RAT (e.g., WCDMA, CDMA2000, GSM, LTE, LTE-A, etc.) to establish a picocell or femtocell. As shown in FIG. 16A, the base station 1614b may have a direct connection to the Internet 1610. Thus, the base station 1614b may not be required to access the Internet 1610 via the core network 1606.

The RAN 1604 may be in communication with the core network 1606, which may be any type of network configured to provide voice, data, applications, and/or voice over internet protocol (VoIP) services to one or more of the WTRUs 1602a, 1602b, 1602c, 1602d. For example, the core network 1606 may provide call control, billing services, mobile location-based services, pre-paid calling, Internet connectivity, video distribution, etc., and/or perform high-level security functions, such as user authentication. Although not shown in FIG. 16A, it should be appreciated that the RAN 1604 and/or the core network 1606 may be in direct or indirect communication with other RANs that employ the same RAT as the RAN 1604 or a different RAT. For example, in addition to being connected to the RAN 1604, which may be utilizing an E-UTRA radio technology, the core network 1606 may also be in communication with another RAN (not shown) employing a GSM radio technology.

The core network 1606 may also serve as a gateway for the WTRUs 1602a, 1602b, 1602c, 1602d to access the PSTN 1608, the Internet 1610, and/or other networks 1612. The PSTN 1608 may include circuit-switched telephone networks that provide plain old telephone service (POTS). The Internet 1610 may include a global system of interconnected computer networks and devices that use common communication protocols, such as the transmission control protocol (TCP), user datagram protocol (UDP) and the internet protocol (IP) in the TCP/IP internet protocol suite. The networks 1612 may include wired or wireless communications networks owned and/or operated by other service providers. For example, the networks 1612 may include another core network connected to one or more RANs, which may employ the same RAT as the RAN 1604 or a different RAT.

Some or all of the WTRUs 1602a, 1602b, 1602c, 1602d in the communications system 1600 may include multi-mode capabilities, e.g., the WTRUs 1602a, 1602b, 1602c, 1602d may include multiple transceivers for communicating with different wireless networks over different wireless links. For example, the WTRU 1602c shown in FIG. 16A may be configured to communicate with the base station 1614a, which may employ a cellular-based radio technology, and with the base station 1614b, which may employ an IEEE 802 radio technology.

Figure 16B:
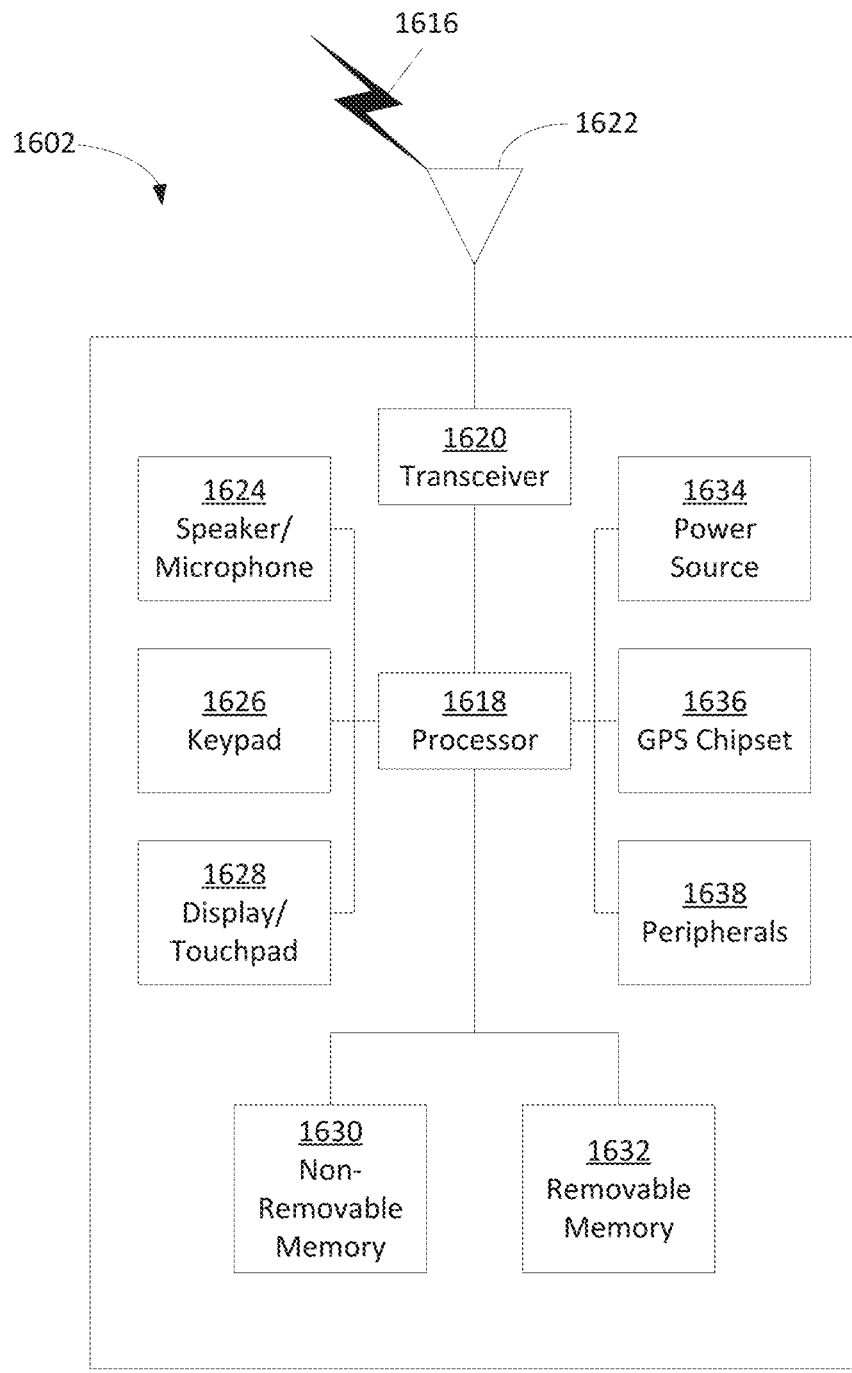
FIG. 16B is a diagram of an example wireless transmit/receive unit (WTRU) that may be used with FIG. 16A.

FIG. 16B is a system diagram of an example WTRU 1602. As shown in FIG. 16B, the WTRU 1602 may include a processor 1618, a transceiver 1620, a transmit/receive element 1622, a speaker/microphone 1624, a keypad 1626, a display/touchpad 1628, non-removable memory 1630, removable memory 1632, a power source 1634, a global positioning system (GPS) chipset 1636, and other peripherals 1638. It should be appreciated that the WTRU 1602 may include any sub-combination of the foregoing elements while remaining consistent with an embodiment.

The processor 1618 may comprise a general purpose processor, a special purpose processor, a conventional processor, a digital signal processor (DSP), a plurality of microprocessors, one or more microprocessors in association with a DSP core, a controller, a microcontroller. Application Specific Integrated Circuits (ASICs), Field Programmable Gate Array (FPGAs) circuits, any other type of integrated circuit (IC), a state machine, and the like. The processor 1618 may perform signal coding, data processing, power control, input/output processing, and/or any other functionality that enables the WTRU 1602 to operate in a wireless environment. The processor 1618 may be coupled to the transceiver 1620, which may be coupled to the transmit/receive element 1622. While FIG. 16B depicts the processor 1618 and the transceiver 1620 as separate components, it should be appreciated that the processor 1618 and the transceiver 1620 may be integrated together in an electronic package or chip.

The transmit/receive element 1622 may be configured to transmit signals to, or receive signals from, a base station (e.g., the base station 1614a) over the air interface 1616. For example, in one embodiment, the transmit/receive element 1622 may be an antenna configured to transmit and/or receive RF signals. In another embodiment, the transmit/receive element 1622 may be an emitter/detector configured to transmit and/or receive IR, UV, or visible light signals, for example. In yet another embodiment, the transmit/receive element 1622 may be configured to transmit and receive both RF and light signals. It should be appreciated that the transmit/receive element 1622 may be configured to transmit and/or receive any combination of wireless signals.

In addition, although the transmit/receive element 1622 is depicted in FIG. 16B as a single element, the WTRU 1602 may include any number of transmit/receive elements 1622. More specifically, the WTRU 1602 may employ MIMO technology. Thus, in one embodiment, the WTRU 1602 may include two or more transmit/receive elements 1622 (e.g., multiple antennas) for transmitting and receiving wireless signals over the air interface 1616.

The transceiver 1620 may be configured to modulate the signals that are to be transmitted by the transmit/receive element 1622 and to demodulate the signals that are received by the transmit/receive element 1622. As noted above, the WTRU 1602 may have multi-mode capabilities. Thus, the transceiver 1620 may include multiple transceivers for enabling the WTRU 1602 to communicate via multiple RATs, such as UTRA and IEEE 802.11, for example.

The processor 1618 of the WTRU 1602 may be coupled to, and may receive user input data from, the speaker/microphone 1624, the keypad 1626, and/or the display/touchpad 1628 (e.g., a liquid crystal display (LCD) display unit or organic light-emitting diode (OLED) display unit). The processor 1618 may also output user data to the speaker/microphone 1624, the keypad 1626, and/or the display/touchpad 1628. In addition, the processor 1618 may access information from, and store data in, any type of suitable memory, such as the non-removable memory 1630 and/or the removable memory 1632. The non-removable memory 1630 may include random-access memory (RAM), read-only memory (ROM), a hard disk, or any other type of memory storage device. The removable memory 1632 may include a subscriber identity module (SIM) card, a memory stick, a secure digital (SD) memory card, and the like. In other embodiments, the processor 1618 may access information from, and store data in, memory that is not physically located on the WTRU 1602, such as on a server or a home computer (not shown).

The processor 1618 may receive power from the power source 1634, and may be configured to distribute and/or control the power to the other components in the WTRU 1602. The power source 1634 may be any suitable device for powering the WTRU 1602. For example, the power source 1634 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1618 may also be coupled to the GPS chipset 1636, which may be configured to provide location information (e.g., longitude and latitude) regarding the current location of the WTRU 1602. In addition to, or in lieu of, the information from the GPS chipset 1636, the WTRU 1602 may receive location information over the air interface 1616 from a base station (e.g., base stations 1614a, 1614b) and/or determine its location based on the timing of the signals being received from two or more nearby base stations. It should be appreciated that the WTRU 1602 may acquire location information by way of any suitable location-determination technique while remaining consistent with an embodiment.

The processor 1618 may further be coupled to other peripherals 1638, which may include one or more software and/or hardware modules that provide additional features, functionality and/or wired or wireless connectivity. For example, the peripherals 1638 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Although features and elements are described above in particular combinations, one of ordinary skill in the art will appreciate that each feature or element may be used alone or in any combination with the other features and elements. Other than the 802.11 protocols described herein, the features and elements described herein may be applicable to other wireless systems. Although the features and elements described herein may have been described for uplink operation, the methods and procedures may be applied to downlink operation. Although SIFS may have been used herein to indicate various inter frame spacing, other inter frame spacing, e.g., RIFS or other agreed time interval may be applied. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU. WTRU, terminal, base station, RNC, or any host computer.

What is claimed is:

1. An access point (AP) comprising:
a transceiver configured to communicate in a wireless local area network (WLAN); and
a processor configured to:
send, via by the transceiver, a first message to a first group of stations of a plurality of stations, wherein the first message is configured to enable the first group of stations to identify a first guard interval of a plurality of different guard intervals;
receive, via the transceiver, a first response to the first message, the first response to the first message comprising an indication of an identified first guard interval of the plurality of different guard intervals for multi-user uplink WLAN communications;
send, via the transmitter, a second message to a second group of stations of the plurality of stations, the second message configured to enable the second group of stations to identify a second guard interval of the plurality of different guard intervals;
receive, via the transceiver, a second response to the second message, the second response to the second message comprising an indication of an identified second guard interval of the plurality of different guard intervals for multi-user uplink WLAN communications, wherein the first guard interval and the second guard interval are different guard intervals of the plurality of different guard intervals utilized by a null data packet (NDP) having a same long training field (LTF) during channel sounding.

2. The access point of claim 1, wherein one of the identified first or second guard interval of the plurality of guard intervals is a longest guard interval of the plurality of different guard intervals.

3. The access point of claim 1, wherein:
the first message comprises a request that each station of the first group of stations perform a time domain channel estimate of a frame received by each station of the first group of stations; and
the second message comprises a request that each station of the second group of stations perform a time domain channel estimate of a frame received by each station of the second group of stations.

4. The access point of claim 1, wherein the first message comprises an indication of the first guard interval of the plurality of different guard intervals and the second message comprises an indication of the second guard interval of the plurality of different guard intervals.

5. The access point of claim 4, wherein the LTF utilizes one of the indicated first or second guard intervals.

6. The access point of claim 1, wherein the processor is further configured to transmit, by the transceiver, a beamforming report poll associated with the NDP.

7. A station (STA) comprising:
a transceiver configured to communicate, in a wireless local area network (WLAN); and
a processor configured to:
receive, via the transceiver, a first message from an access point (AP), wherein the first message is configured to be transmitted to a first group of STAs of a plurality of STAs;
identify, based on the first message from the AP, a first guard interval of a plurality of different guard intervals;
send, via the transceiver, a response to the first message received from the AP, the response to the first message comprising an indication of the identified first guard interval of the plurality of different guard intervals for multi-user uplink WLAN communications;
receive, via the transceiver, a second message from the AP, wherein the second message is configured to be transmitted to a second group of STAs of the plurality of STAs;
identify, based on the second message from the AP, a second guard interval of the plurality of different guard intervals; and
send, via the transceiver, a response to the second message received from the AP, the response to the second message comprising an indication of the identified second guard interval of the plurality of different guard intervals for multi-user uplink WLAN communications, wherein the first guard interval and the second guard interval are different guard intervals of the plurality of different guard intervals utilized by a null data packet (NDP) having a same long training field (LTF) during channel sounding.

8. The STA of claim 7, wherein at least one of the guard intervals of the plurality of different guard intervals is compatible with a legacy LTF.

9. The STA of claim 7, wherein one of the identified first or second guard interval of the plurality of different guard intervals is a longest guard interval of the plurality of different guard intervals.

10. The STA of claim 7, wherein:
the first message comprises an indication of the first guard interval of the plurality of different guard intervals; and
the second message comprises an indication of the second guard interval of the plurality of different guard intervals, wherein the processor is configured to identify the first guard interval and the second guard interval of the plurality of different guard intervals from the indicated guard intervals in the respective first message and second message.

11. The STA of claim 10, wherein the processor is configured to receive, via the transceiver, the NDP.

12. The STA of claim 11, wherein the processor is configured to transmit, via the transceiver, a beamforming report based on the NDP.

13. A method performed by a station (STA), the method comprising:
receiving a first message from an access point (AP) in a wireless local area network (WLAN), wherein the first message is configured to be transmitted to a first group of stations of a plurality of stations;
identifying, based on the first message from the AP, a first guard interval of a plurality of different guard intervals;
sending a response to the first message from the AP, the response to the first message comprising an indication of the identified first guard interval of the plurality of different guard intervals for multi-user uplink WLAN communications;
receiving a second message from the AP, wherein the second message is configured to be transmitted to a second group of STAs of the plurality of STAs;
identifying, based on the second message from the AP, a second guard interval of the plurality of different guard intervals; and
sending a response to the second message received from the AP, the response to the second message comprising an indication of the identified second guard interval of the plurality of different guard intervals for multi-user uplink WLAN communications, wherein the first guard interval and the second guard interval are different guard intervals of the plurality of different guard intervals utilized by a null data packet (NDP) having a same long training field (LTF) during channel sounding.

14. The method of claim 13, wherein at least one of the guard intervals of the plurality of different guard intervals is compatible with a legacy LTF.

15. The method of claim 13, wherein one of the identified first or second guard intervals of the plurality of different guard intervals is a longest guard interval of the plurality of different guard intervals.

16. The method of claim 13, wherein:
the first message comprises an indication of the first guard interval of the plurality of different guard intervals; and
the second message comprises an indication of the second guard interval of the plurality of different guard intervals, wherein the first guard interval and the second guard interval of the plurality of different guard intervals are identified from the indicated guard intervals in the respective first message and second message.

17. The method of claim 16, further comprising receiving the NDP.

18. The method of claim 17, further comprising transmitting a beamforming report based on the NDP.

* * * * *